US012085151B2

(12) United States Patent
Silver et al.

(10) Patent No.: US 12,085,151 B2
(45) Date of Patent: *Sep. 10, 2024

(54) SYNCHRONIC DRIVE

(71) Applicant: Argent Automation Inc., Somerville, AL (US)

(72) Inventors: Stephen Craig Silver, Somerville, AL (US); Craig Laurence Silver, Mt. Airy, MD (US)

(73) Assignee: Argent Automation Inc., Somerville, AL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/230,344

(22) Filed: Aug. 4, 2023

(65) Prior Publication Data

US 2024/0200639 A1 Jun. 20, 2024

Related U.S. Application Data

(63) Continuation of application No. 18/081,473, filed on Dec. 14, 2022, now Pat. No. 11,761,517.

(51) Int. Cl.
  *F16H 15/38* (2006.01)
  *F16H 15/48* (2006.01)
  *F16H 15/50* (2006.01)

(52) U.S. Cl.
  CPC ............. *F16H 15/38* (2013.01); *F16H 15/48* (2013.01); *F16H 15/503* (2013.01)

(58) Field of Classification Search
  CPC .......... F16H 15/38; F16H 12/48; F16H 15/40; F16H 15/44; F16H 15/503

USPC .......... 475/183, 185, 191, 192, 197; 476/40
See application file for complete search history.

(56) References Cited

U.S. PATENT DOCUMENTS

| | | | |
|---|---|---|---|
| 1,753,784 A | 4/1930 | Herzog | |
| 2,170,733 A | 8/1939 | Sharpe | |
| 2,490,525 A | 12/1949 | Koller | |
| 4,159,653 A * | 7/1979 | Koivunen | F16H 15/38 476/41 |
| 4,497,221 A | 2/1985 | Koser | |
| 4,983,151 A | 1/1991 | Pires | |
| 5,071,393 A | 12/1991 | Genovese | |
| 5,108,352 A | 4/1992 | Pires | |
| 5,406,863 A | 4/1995 | Korge | |

(Continued)

*Primary Examiner* — Roger L Pang
(74) *Attorney, Agent, or Firm* — Stephen Y. Liu; James H. Ortega; Carstens, Allen & Gourley, LLP

(57) ABSTRACT

A drive system comprising a rotatable input disc that receives an input rotational force and rotates about a longitudinal axis, where the input disc comprises driving features formed on its interior face. The drive system also comprises a rotatable output disc that rotates about the longitudinal axis and comprises driving features formed on its interior face, where the output disc provides an output rotational force. The drive system comprises a drive core between the interior face of the input disc and the interior face of the output disc to translate the input rotational force to the output rotational force. As the input disc is rotated by the input rotational force, engaging feature(s) of power disc(s) in the drive core engages the driving features of the input disc causing rotation of each power disc. As the power disc(s) is rotated, the engaging feature(s) of each power disc(s) engages the driving features of the output disc causing rotation of the output disc.

15 Claims, 18 Drawing Sheets

(56) References Cited

U.S. PATENT DOCUMENTS

| | | | |
|---|---|---|---|
| 5,415,602 A | 5/1995 | Benesch | |
| 5,980,412 A | 11/1999 | Smith | |
| 5,997,427 A | 12/1999 | Fenton | |
| 6,527,671 B2 | 3/2003 | Paalasmaa et al. | |
| 8,360,917 B2* | 1/2013 | Nichols | F16H 61/6649 475/196 |
| 10,274,059 B2 | 4/2019 | Kwon et al. | |
| 11,143,276 B2 | 10/2021 | Fahrni et al. | |
| 11,761,517 B1* | 9/2023 | Silver | F16H 15/38 476/40 |
| 2004/0023753 A1* | 2/2004 | Ervin | F16H 15/38 476/40 |
| 2006/0189435 A1* | 8/2006 | Flaig | F16H 15/38 476/40 |
| 2007/0200208 A1 | 8/2007 | Wang | |
| 2015/0211610 A1 | 7/2015 | Blouin | |
| 2017/0030439 A1 | 2/2017 | Tanaka et al. | |
| 2018/0223971 A1 | 8/2018 | Cheng | |

* cited by examiner

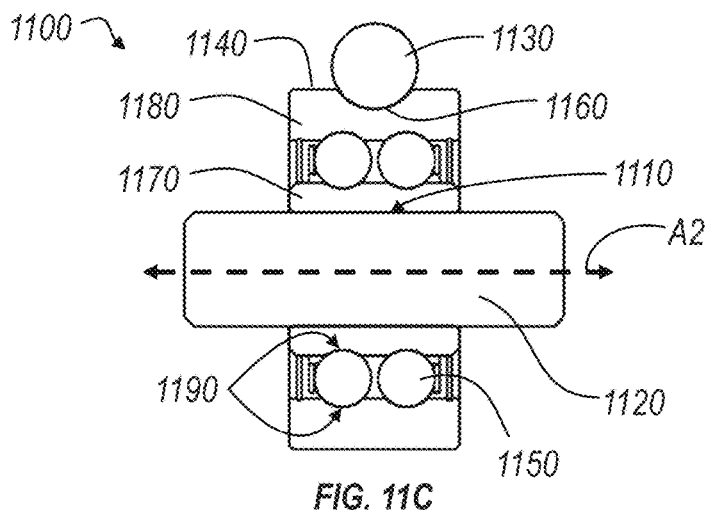
FIG. 11C
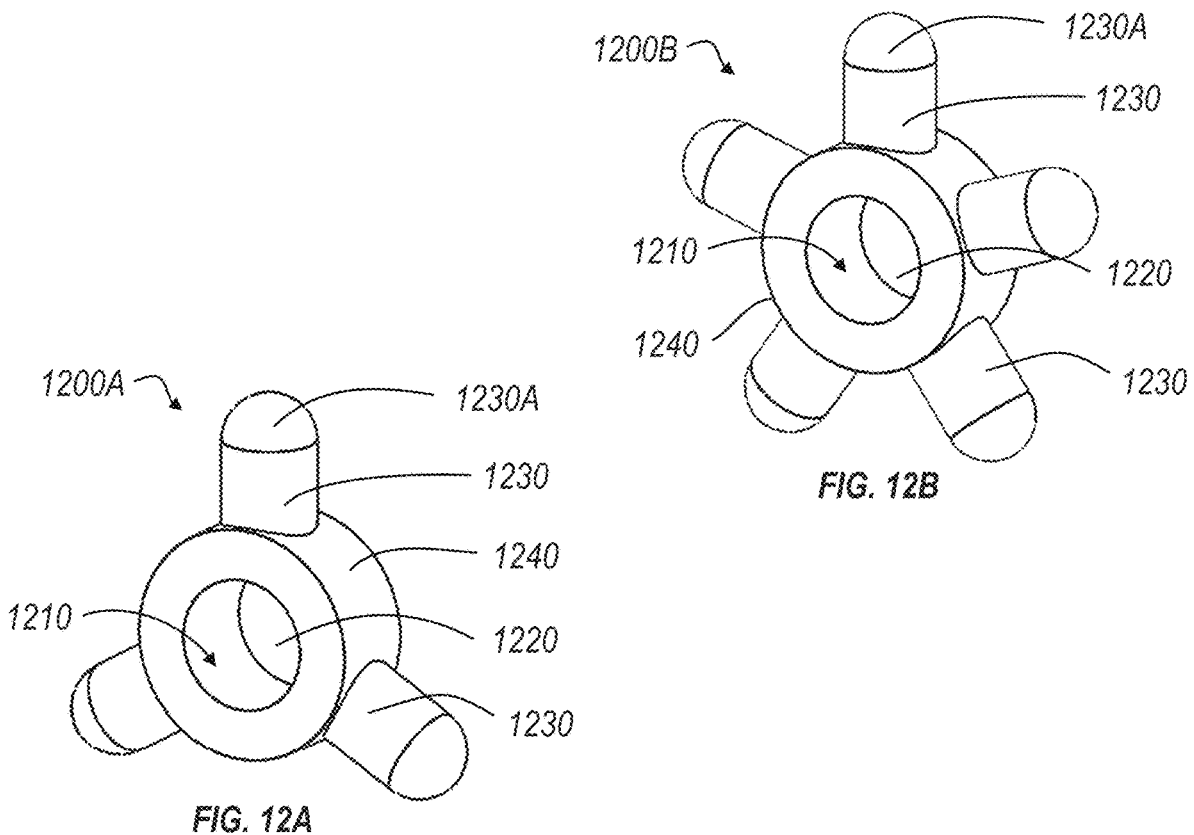
FIG. 12B
FIG. 12A

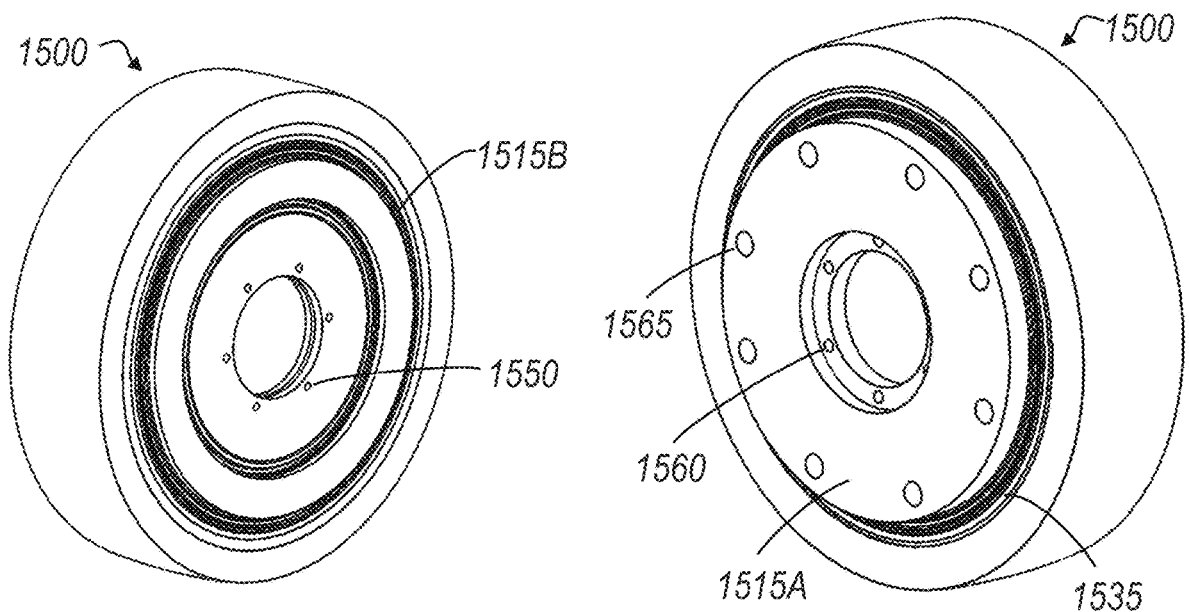
FIG. 15A
FIG. 15B
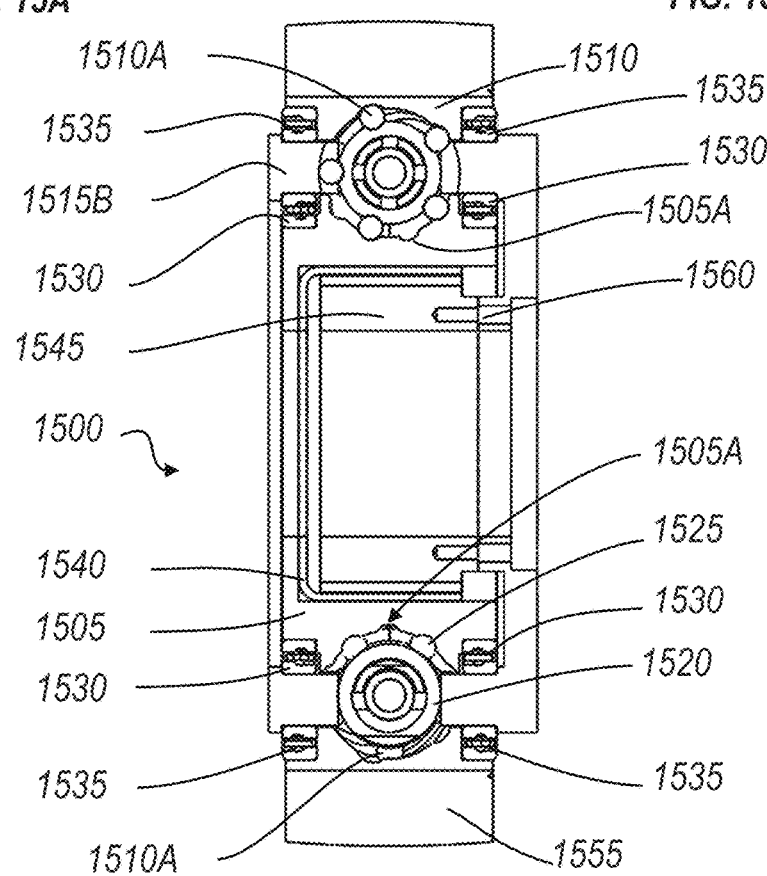
FIG. 15C

SYNCHRONIC DRIVE

STATEMENT OF RELATED APPLICATIONS

This application is a continuation of pending U.S. Ser. No. 18/081,473, filed on Dec. 14, 2022, the entirety of which is incorporated herein by reference in its entirety for all purposes.

TECHNICAL FIELD

The disclosed principles relate, generally, to rotational drive systems, and more particularly to a synchronic drive system employing non-traditional design and components to provide increase or decrease in input-to-output rotational drive ratios.

BACKGROUND

Gearboxes, transmissions, and other drive systems are used to provide propulsion for a variety of applications by providing either an increase or reduction in the ratio between input rotation and output rotation. For example, gearboxes, such as those having gear trains or planetary gears, are used to provide a mechanical advantage between the input and output of the gearbox. In such cases, the gearbox or other drive system reduces the output rotation in proportion to the input rotation, which results in an increase in rotational torque at the expense of rotational speed through the drive system. Conversely, a drive system that increases rotational output as compared to the input rotation provides an increase in rotational speed, but at the expense of reducing torque.

Additionally, drive systems that provide such increases or decreases in rotational speed versus torque have traditionally been manufactured in just a few ways. These include drives systems that employ traditional gears with teeth, as well as systems that employ pulleys and belts or even screws combined with toothed gears. Moreover, some drive systems employ solid contact between its internal components, such as planetary and worm gear gearboxes, while others employ fluid or other non-solid contact between components, such hydraulic and hydrostatic transmissions. However, among drive systems that employ solid contact among components, the use of either toothed gears or belts/pulleys has become ubiquitous. As such, even novel drive systems and transmissions have traditionally been limited to new designs employing the same basic components in a new manner.

Accordingly, what is needed in the art is an entirely new approach to drive system designs, which does not rely on the same basic conventional components of gears or pulleys. Indeed, what is needed in not an evolutionary approach to gearbox or drive system design, but an actual revolutionary approach that does not employ drive system fundamentals found in conventional approaches. The disclosed principles for a synchronic drive provide such a revolutionary approach to drive system design. For example, a synchronic drive as disclosed herein provides improved bearing surface of the gears (e.g., line contact) that increases the overall load capability and decreases fatigue life as compared to conventional geared drive systems. Existing drive systems are also subject to backlash, pitting, or flaking of the gear teeth, which is avoided by a synchronic drive as disclosed herein. Moreover, conventional technologies do not have enough torsional stiffness in, for example, geared drives or flexible wave strain systems, which typically results in wind up that a disclosed synchronic drive alleviates. Furthermore, conventional geared systems are deficient in efficiency due to high friction with sliding contact among components, where such friction is significantly reduced by the type of contact provided by disclosed drive systems. Still further, some (i.e., high) gear ratios are not possible within a single stage when employing conventional gear drives. For example, a planetary gear is limited to a ratio of just 10:1 in a single stage, and thus higher ratios are achieved only by stacking multiple stages. In contrast, a synchronic drive as disclosed below can achieve ratios ranging from about 9:1 to 100:1 in a single stage. Each of these advantages of a synchronic drive designed in accordance with the disclosed principles, as well as other advantages, are explored in further detail below.

SUMMARY

To overcome the deficiencies of the conventional methods discussed above, the disclosed principles provide for novel drive system altering a ratio between an input rotational speed and an output rotational speed. In one embodiment, such a drive system comprises a rotatable input disc configured to receive an input rotational force, and configured to rotate about a longitudinal axis, where the input disc comprises driving features formed on an interior face of the input disc. Such an embodiment also comprises a rotatable output disc configured to rotate about the longitudinal axis and comprising driving features formed on an interior face of the output disc, where the output disc is configured to provide an output rotational force.

Furthermore, such an embodiment of a drive system as disclosed herein may comprise a drive core positioned between the interior face of the input disc and the interior face of the output disc to translate the input rotational force to the output rotational force. The drive core is configured to rotate about the longitudinal axis and comprises at least one rotatable power disc. Each such power disc comprises at least one engaging feature protruding from a rotational perimeter of a corresponding power disc, and is configured to engage the driving features of the input disc and the driving features of the output disc. Also, each such power disc rotates about a corresponding pivot axis, wherein each of those pivot axes is perpendicular to a rotational plane defined by the interior face of the input disc and to a rotational plane defined by the interior face of the output disc. Moreover, a rotational plane of each such power disc intersects with the longitudinal axis mentioned above.

In such exemplary embodiments, as the input disc is rotated by the input rotational force, the engaging feature(s) of the power disc(s) engages the driving features of the input disc causing rotation of each power disc. As the power disc(s) is rotated, the engaging feature(s) of each power disc(s) further engages the driving features of the output disc causing rotation of the output disc.

BRIEF DESCRIPTION OF THE DRAWINGS

The novel features believed characteristic of the disclosure are set forth in the appended claims. The invention itself, however, as well as a preferred mode of use, further objectives, and advantages thereof, will be best understood by reference to the following detailed description of illustrative embodiments when read in conjunction with the accompanying drawings, wherein:

FIG. 11C illustrates a front cross-sectional view of the embodiment of a power disc illustrated in FIGS. 11A and 11B.

FIG. 12A illustrates an alternative embodiment of a power disc.

FIG. 12B illustrates an alternative embodiment of a power disc, similar to the power disc illustrated in FIG. 12A.

FIG. 15A illustrates an isometric view of one embodiment of a large through hole version of a synchronic drive in accordance with the disclosed principles.

FIG. 15B illustrates another isometric view of the embodiment of the large through hole version of a synchronic drive illustrated in FIG. 15A.

FIG. 15C illustrates a side cross-sectional view of the embodiment of the large through hole version of a synchronic drive illustrated in FIGS. 15A and 15B.

DETAILED DESCRIPTION

Figure 1:
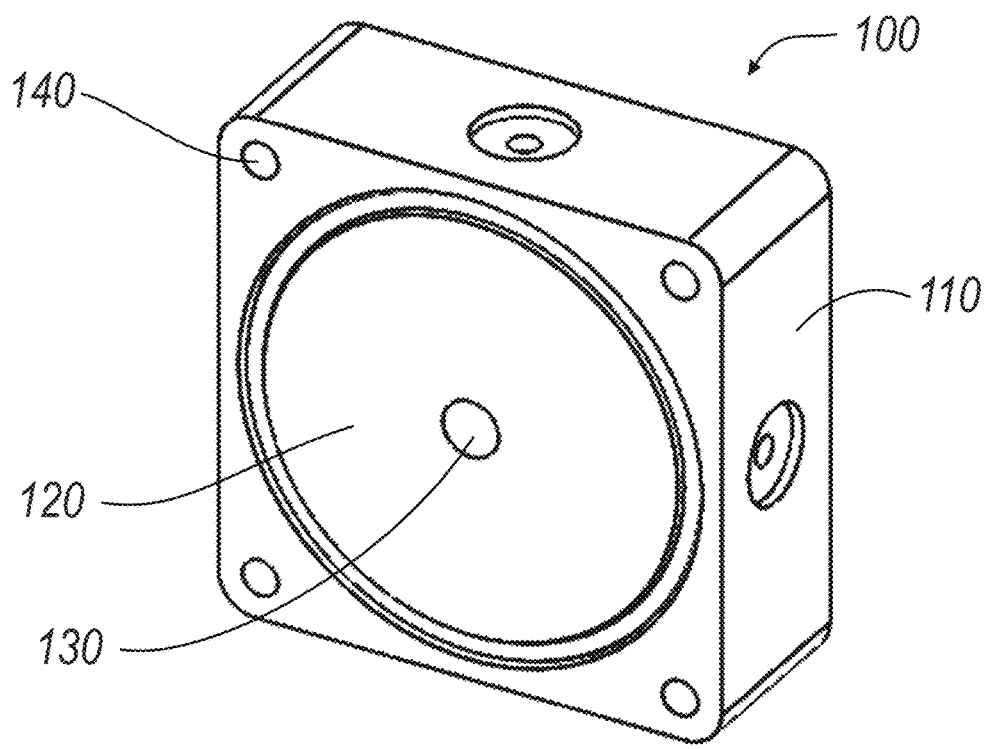
FIG. 1 illustrates an exterior isometric view of one embodiment of a synchronic drive, in accordance with the disclosed principles.

Looking initially at FIG. 1, illustrated is an exterior isometric view of one embodiment of a synchronic drive 100, in accordance with the disclosed principles. In particular, this embodiment of a synchronic drive is disposed within a slim rectangular housing 110, which includes an input disc (not shown) on one face of the housing 110 and an output disc 120. As described in detail herein, when the input disc is rotated, the output disc 120 is proportionally rotated at an increased or reduced ratio to the rotation of the input disc. Additionally, a bore 130 may be provided on the output disc 120 to driving a shaft with the synchronic drive 100. An input bore (not shown) may also be provided in the input disc to provide the input rotation to the synchronic drive 100. Also, one or more mounting holes may be provided in the housing 110 to secure the synchronic drive 100 in a particular application.

Figure 2:
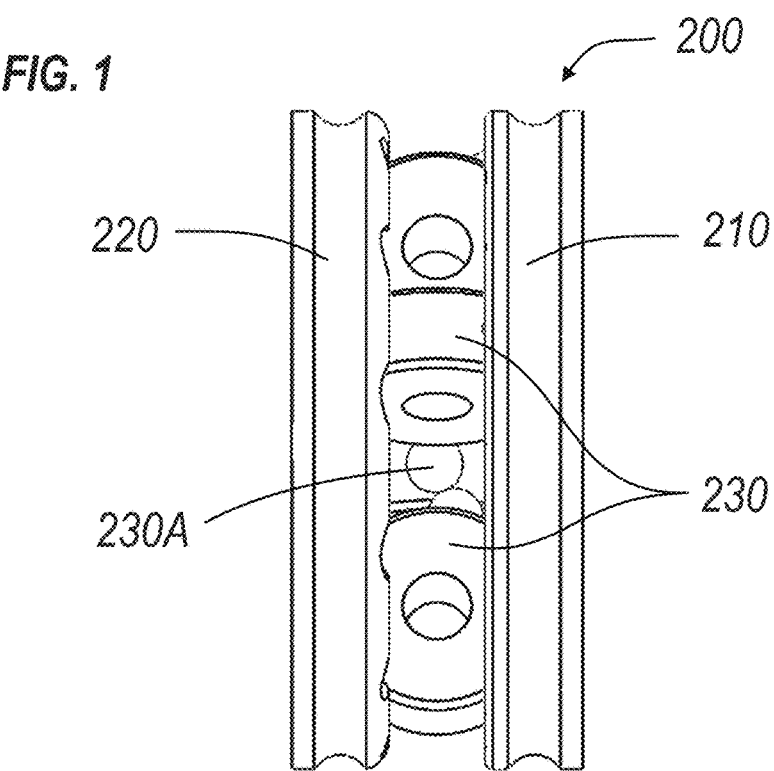
FIG. 2 illustrates an internal side view of one embodiment of a disclosed synchronic drive, in accordance with the disclosed principles.

FIG. 2 illustrates an internal side view of one embodiment of a disclosed synchronic drive 200, in accordance with the disclosed principles. This embodiment of a synchronic drive 200 again includes an input disc 210 and an output disc 220. The input disc 210 receives an input to the synchronic drive 200 in the form of a rotational input. This rotational input could be provided via a shaft positioned in a bore (not shown) at the center of the input disc 210, or could be provided via another rotating input device affixed to the exterior face of the input disc 210. The input disc 210 and the output disc 220 are coaxial, and thus share a common axis of rotation.

As the input disc 210 is rotated by an input force, features formed on the interior face of the input disc 210 (described in detail below) cause a plurality of power discs 230 to rotate within the synchronic drive 200. Each of these power discs 230 is comprised of a circular component rotating about a pivot shaft, where a plurality of spherical features (collectively, 230A) is embedded within an exterior surface of the circular components. As the input disc 210 is rotated, the features on the interior face of the input disc 210 engages one or more of the spherical features 230A, which causes the rotation of the circular component of each of the plurality of power discs 230. As the power discs 230 are rotated within the synchronic drive 200, the spherical features 230A engage features formed on the interior face of the output disc 220 (also described in detail below).

As the rotating power discs 230 move one or more of the now-engaged spherical features 230A along the features of the interior face of the output disc 220, the output disc 220 itself is correspondingly rotated. More specifically, the axis of rotation of the power discs 230 are parallel to the interior faces of both the input disc 210 and the output disc 220. This positioning of the pivot/rotational axes of the power discs 230 results in a perpendicular alignment between the rotational movement (i.e., plane) of the power discs 230 and each of the interior faces of the input disc 210 and the output disc 220. Additionally, the rotational plane of each of the power discs 230 intersects with the rotational axis of the input and output discs 210, 220. The combination of the parallel alignment of the rotational axes of the power discs 230 with the input and output discs 210, 220, the perpendicular alignment of the rotational plane of the power discs 230 and the rotational planes of the input and output discs 210, 220, and the intersection of the rotational plane of each power disc 230 with the shared rotational axis of the input and output discs 210, 220, results in the translation of the rotation of the input disc 210 into a lifting force on the power discs 230, and then a translation of the lifting force of the power discs 230 to a rotational force of the output disc 220. The output disc 220 may then have a shaft or other component affixed to its exterior face, or through a bore at its center, to receive the output rotational movement from the synchronic drive 200. As described in detail below, variations on the features formed on the interior face of the input disc 210 and the features formed on the interior face of the output disc 220 provide the ratio of input rotation to output rotation for a synchronic drive constructed in accordance with the disclosed principles.

Figure 3:
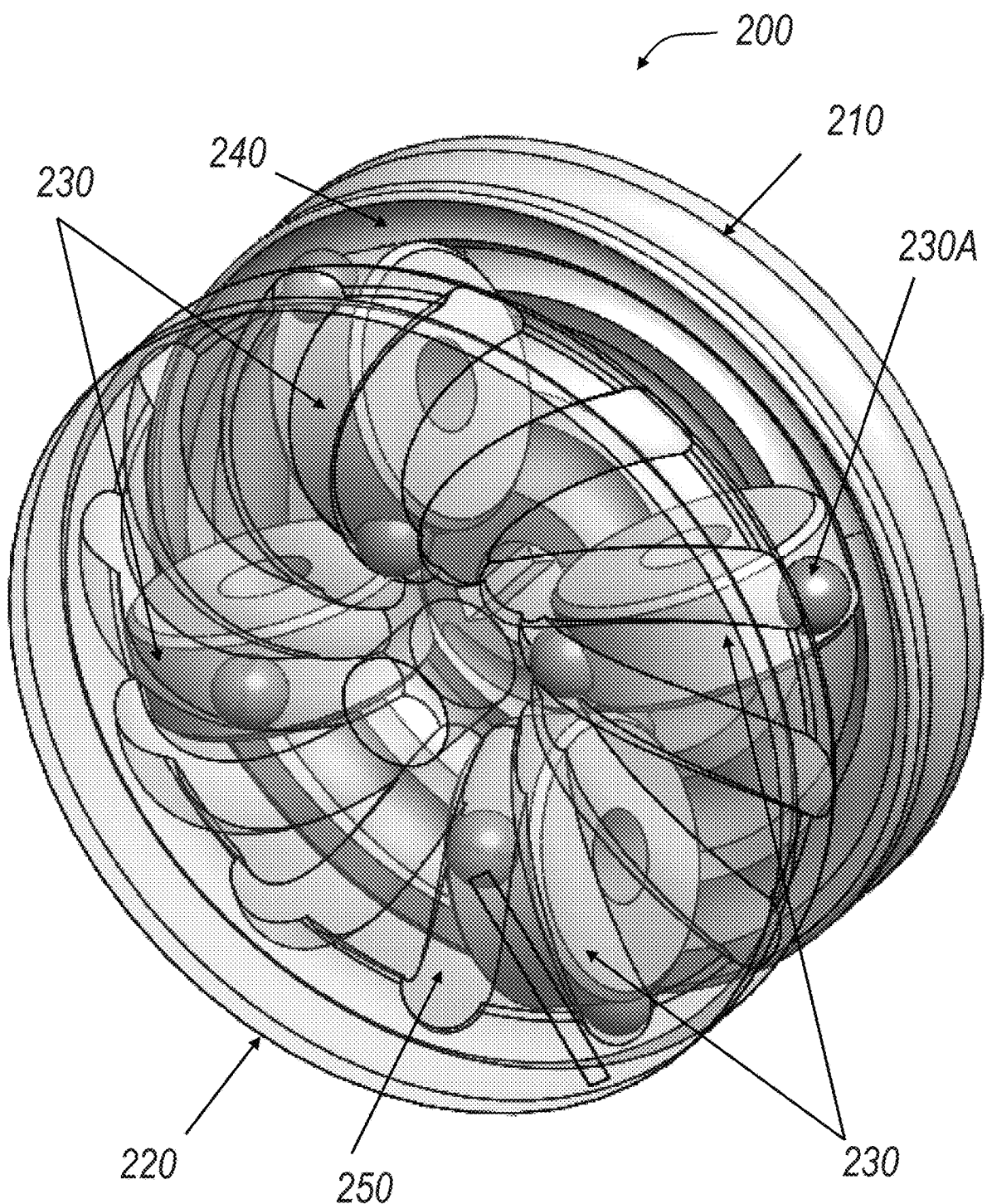
FIG. 3 illustrates isometric partially transparent view of the embodiment of a synchronic drive illustrated in FIG. 2.

Turning now to FIG. 3, illustrated is an isometric, partially transparent view of the embodiment of the synchronic drive 200 constructed in accordance with the disclosed principles illustrated in FIG. 2. Shown in this isometric view of the synchronic drive 200 are the input disc 210, output disc 220, and four power discs 230 providing the translation of the rotational speed of the input disc 210 to a different rotational speed of the output disc 220. Better visible from this isometric view are the perpendicular alignment of the rotational plane of the power discs 230 and the rotational planes of the input and output discs 210, 220, as well as the intersection of the rotational plane of each power disc 230 with the shared rotational axis of the input and output discs 210, 220.

Partially illustrated in this view of this embodiment of the synchronic drive 200 are the features formed in the interior faces of the input and output discs 210, 220. In the input disc 210, the features formed into its interior face are grooves 240 having a semicircular (or partially circular, depending on the embodiment) profile or cross-section in its curvature, and which are sized to correspond to, and thus receive within them, the exterior curvature of the spherical features 230A. Similarly, the features formed into the interior face of the output disc 220 are also grooves 250 having a curvature profile or cross-section that is semicircular (or partially circular) and also sized to correspond to, and thus receive therein, the exterior curvature of the spherical features 230A. The distinction between the grooves 240 of the input disc 210 and the grooves 250 of the output disc 220 is in the design and shape in which each set of semicircular (or partially circular) grooves are formed into the interior faces of the input disc 210 and the output 220. The unique design and shape of each disc's grooves is discussed in detail below.

Figure 4:
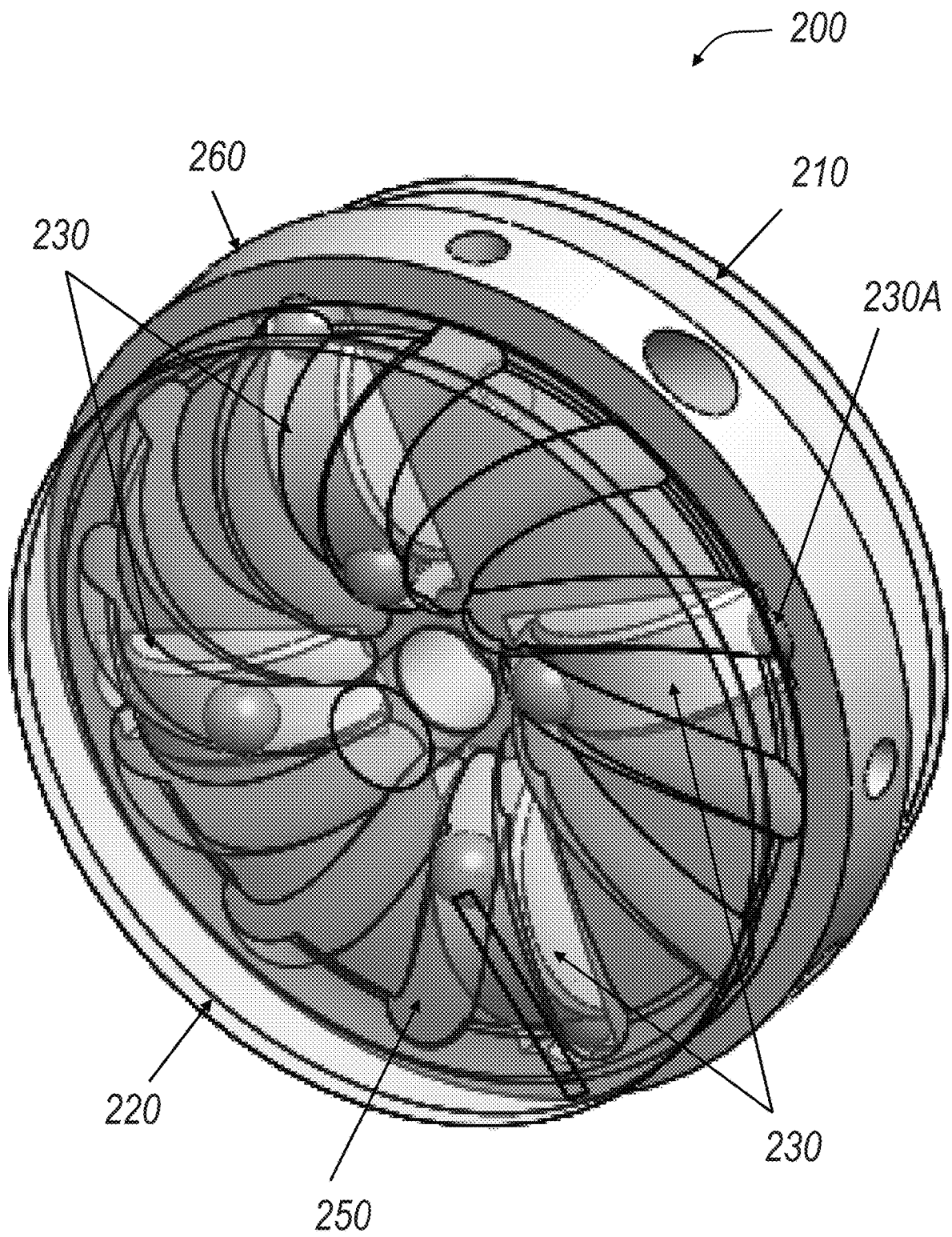
FIG. 4 illustrates another isometric partially transparent view of the embodiment of the synchronic drive illustrated in FIGS. 2 and 3.

Looking briefly at FIG. 4, illustrated is another isometric, partially transparent view of the embodiment of the synchronic drive illustrated in FIGS. 2 and 3. This illustration of this embodiment of the synchronic drive 200 again includes the input disc 210, the output disc 220, and the power discs 230 configured and arranged to translate the rotational force applied to the input disc 210 to a rotational force at the output disc 220 at a predetermined ratio. Also shown again are the grooves 250 formed into the interior face of the output disc 220.

Additionally illustrated in FIG. 4 is an indexing plate 260. As described in additional detail below, the one or more indexing plates 260 is used in embodiments of the disclosed synchronic drive to position the plurality of power discs in their respective positions with respect to both the input disc 210 and the output 220. Thus, it is the indexing plate(s) 260 that provides the combination of the parallel alignment of the pivot shafts of the power discs 230 (held in place by the indexing plate(s) 260, as described further below) with the input and output discs 210, 220, which in turn provides the perpendicular alignment of the rotational plane of the power discs 230 and the rotational planes of the input and output discs 210, 220, and the intersection of the rotational plane of each power disc 230 with the shared rotational axis of the input and output discs 210, 220.

Figure 5A:
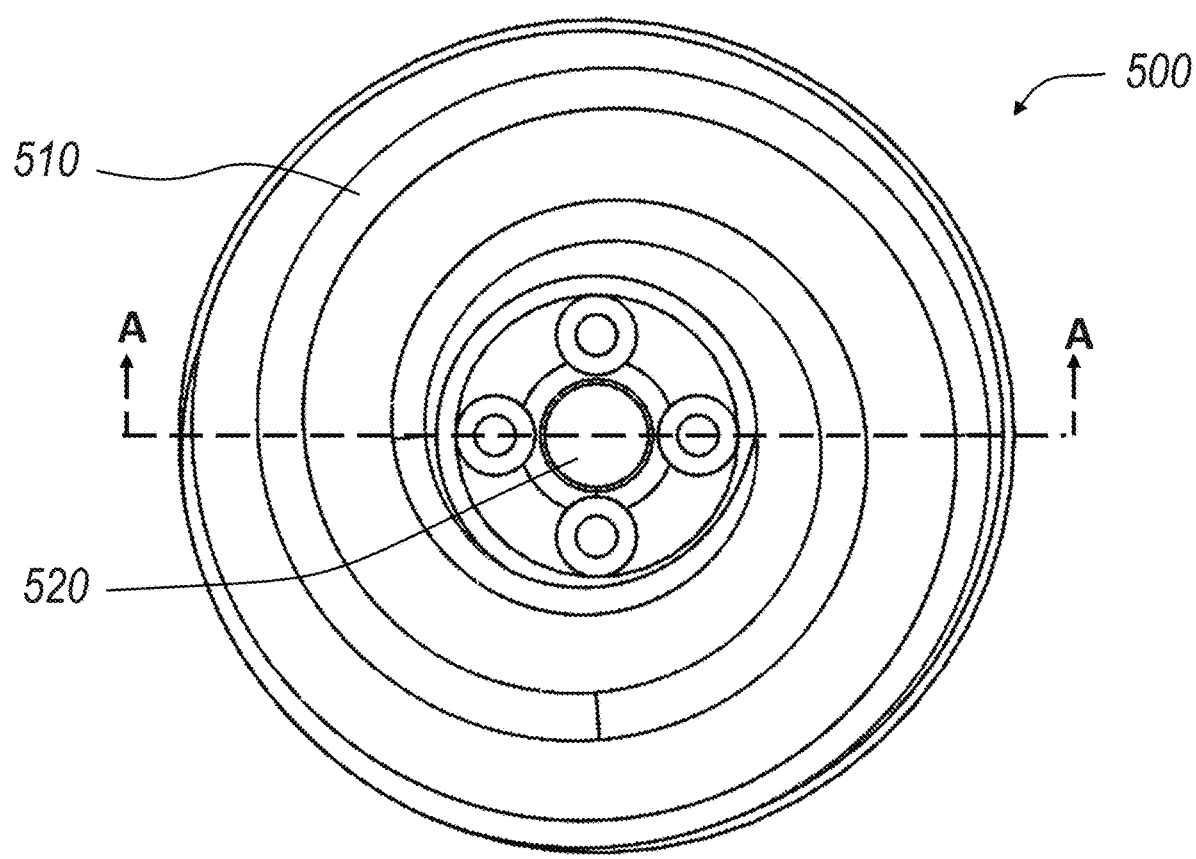
FIG. 5A illustrates one embodiment of an input disc for a synchronic drive in accordance with the disclosed principles.
Figure 5B:
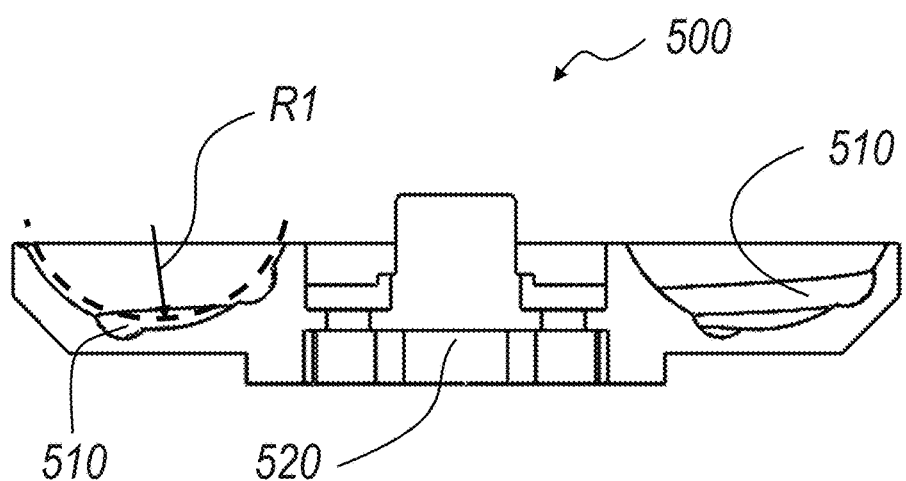
FIG. 5B illustrates a cross-sectional view taken along line A-A of the embodiment of the input disc illustrated in FIG. 5A.

FIG. 5A illustrates a front view of one embodiment of an input disc 500 for a synchronic drive designed and constructed in accordance with the disclosed principles. FIG. 5B illustrates a cross-sectional view taken along line A-A of the embodiment of the input disc 500 illustrated in FIG. 5A. The front view of the input disc 500 in FIG. 5A illustrates the driving face of the input disc 500. Also shown in the front view is a mounting hole 520 positioned at the center of the input disc 500. The mounting hole 520 is used to secure the input disc 500 on a drive shaft used to turn the input disc 500 using a motor or similar apparatus configured to provide an input rotational force to the input disc 500. Although in this embodiment the mounting hole 520 is a keyed hole, other shapes of mounting holes may also be formed in the input disc 500.

In accordance with the disclosed principles, the interior or driving face of the input disc 500 is comprised of a three-dimensional Archimedean spiral 510. An Archimedean spiral is a spiral where the locus corresponds to the locations over time of a point moving away from a fixed point with a constant speed along a line that rotates with constant angular velocity. An Archimedean spiral is distinguishable from a logarithmic spiral in that the distances between the turnings of a logarithmic spiral increase in geometric progression, while in an Archimedean spiral these distances are constant. Additionally, the Archimedean spiral 510 comprised in the driving face of the input disc 500 is three-dimensional in that the spiral's turns are formed with parallel lines of curvature defining a channel (e.g., the grooves discussed below) therebetween, as opposed to a simple line with no thickness providing the spiral's turns.

Moreover, the channel or groove forming the Archimedean spiral 510 comprises a curvature such that it has a partial-circular or semi-circular cross-sectional profile. More specifically, in such embodiments, the radius of the curvature of the groove/channel's profile is substantially equal to the radius of the spherical features (e.g., features 230A in FIG. 2), or 0.001"-0.025" larger than the radius of the spherical features, so as to receive the spherical features within the groove and still allow rolling movement of the spherical features within the groove. Alternatively, the cross-sectional profile of the spiral's groove comprises a Gothic Arch-shape. In preferred embodiments, the less play between the spherical features and the curved walls of the groove, the better, while still permitting rolling movement within the channel. Advantageously, the tighter the fit between the spherical features and the interior surfaces of the grooves, while still permitting rolling movement of the spherical features, the less backlash (i.e., "slack") present in the disclosed drive. Moreover, in embodiments where the synchronic drive as disclosed herein is operated in both rotational directions, the switch from one rotational direction to another can be provided with little to no backlash in the drive. Alternatively, a self-locking or "non-backdrivable" operation of a synchronic drive as disclosed herein can be achieved by providing shallower spiral angles on the input disc and in combination with the output shaft geometry. In such embodiments, rotation of the output disc is only achieved by rotation of the input disc. Thus, operation of the drive can be both statically and dynamically "braked" by ceasing the input rotational force to the drive.

Furthermore, as shown in the cross-sectional view of FIG. 5B, the Archimedean spiral 510 also comprises a curvature when viewing the cross-sectional profile of the spiral 510, where the shallow edges of the curvature are proximate the center and outer edge of the input disc 500 and the deepest point of the curvature is midway between the center and outer edge of the input disc 500. As such, the radius $R_1$ of this curvature of the spiral's cross-sectional profile is equal to the radius of curvature of the power disc (e.g., power disc 230 in FIG. 2) as measured from the rotational axis of the power disc to the centers of the plurality of spherical features carried on the outer surface of the power disc (shown below as well). This radius of curvature of the power disc(s) is discussed in further detail below and illustrated in FIGS. 10A-10B. As will be discussed below, by matching the radius of curvature $R_1$ of the Archimedean spiral 510 and that of the power disc, the power discs will rotate around their pivot/rotational axes with their spherical features received (in progression) within the groove of the driving face as the input disc 500 is rotated.

Figure 6A:
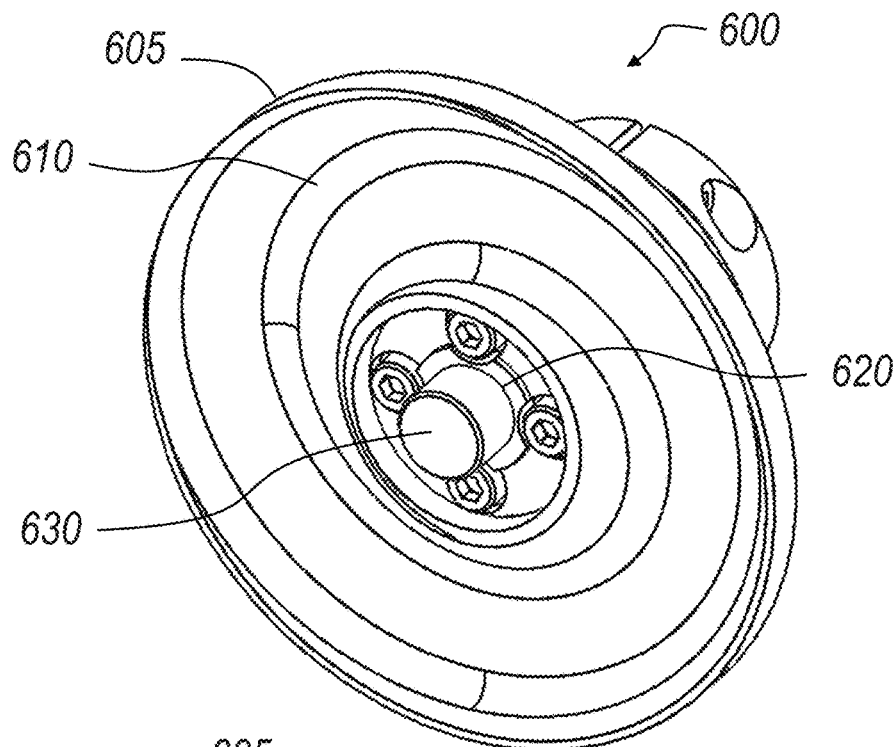
FIG. 6A illustrates an isometric view of another embodiment of an input disc for a synchronic drive in accordance with the disclosed principles.

Looking now at FIG. 6A, illustrated is a front isometric view of another embodiment of an input disc assembly 600 for a synchronic drive constructed in accordance with the disclosed principles. As before, this embodiment of an input disc 605 as disclosed herein includes an Archimedean spiral 610 on its interior face. In addition, the input disc 605 includes a center bore 620, which typically receives an input drive shaft 630 for providing input rotational force to the input disc 605. As illustrated, the Archimedean spiral 610 in this embodiment has a curvature that is less severe or "tight" as compared to spiral curvature of the embodiment illustrated in FIG. 5A. The formulae for calculating the tightness of the curvature for a given Archimedean spiral are known to those skilled in the art, and thus they will not be repeated here. However, altering the tightness of the turns or curvature of the Archimedean spiral 610 on the input disc equates to changing the pitch of the input disc 605. This, in turn, alters the rotational ratio between the input disc 605 and an outpost disc (not illustrated) by correspondingly altering the rotational speed imparted on the power discs positioned between input and output discs.

Figure 6B:
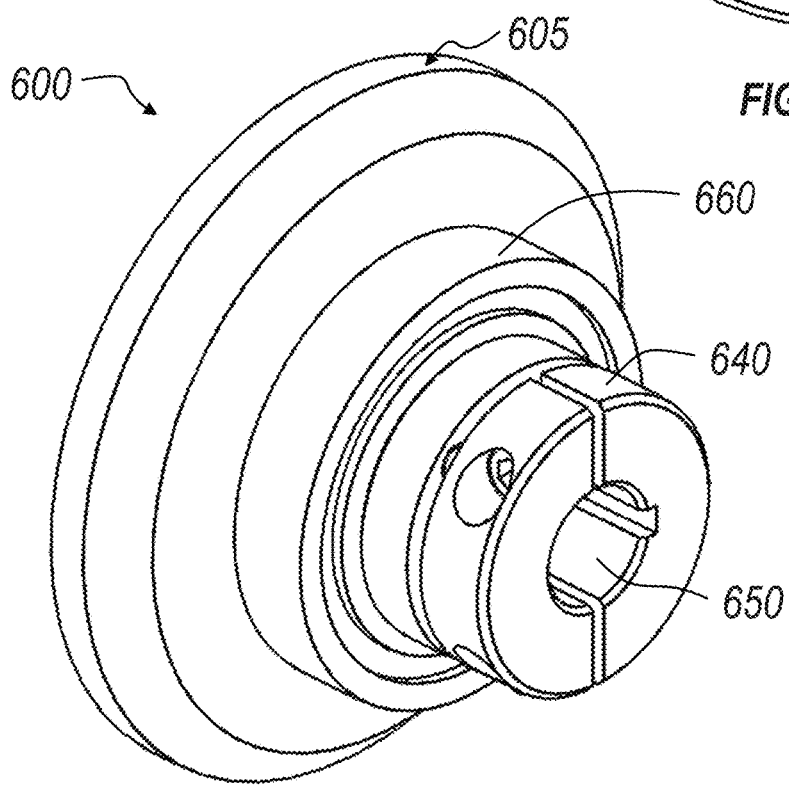
FIG. 6B illustrates another isometric view of the embodiment of the input disc illustrated in FIG. 6A.

FIG. 6B illustrates a rear isometric view of the embodiment of the input disc assembly 600 illustrated in FIG. 6A. From this rear view, a motor shaft coupling 640 is illustrated having a first end coupled to the input shaft 630, and a second end providing an opening 650 for receiving a drive shaft from a motor or other drive component. In some embodiments, the coupling 640 is a flexible shaft coupling, but other types of couplings are also envisaged. Also seen in the rear view of FIG. 6B is a contact bearing 660 mounted to an exterior of the input disc 605. Such a bearing 660 may be employed when the input disc 605 is mounted in a housing, an embodiment of which is discussed in further detail below.

Figure 7A:
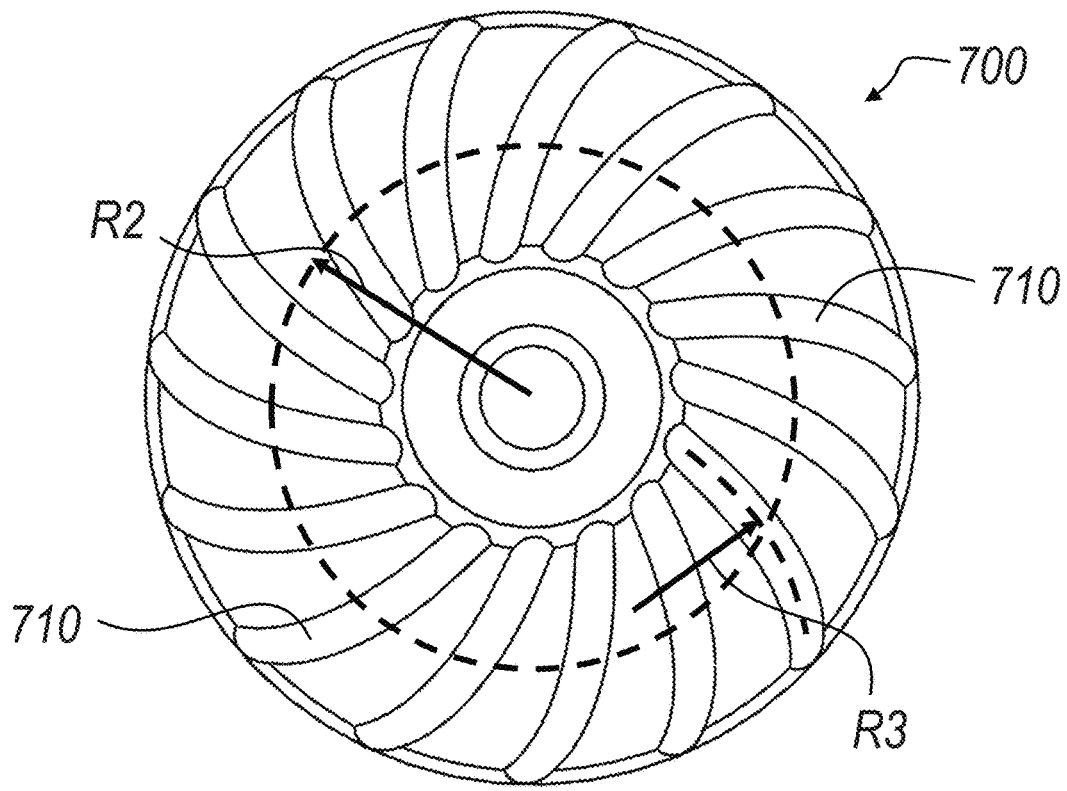
FIG. 7A illustrates one embodiment of an output disc for a synchronic drive in accordance with the disclosed principles.

Turning now to FIG. 7A, illustrated is one embodiment of an output disc 700 for a synchronic drive designed and constructed in accordance with the disclosed principles. As shown, the output disc 700 comprises a plurality of grooves 710 formed into its interior face, where the grooves 710 are sized to receive the spherical features carried by the power discs (such as power discs 230 carrying features 230A in FIG. 2).

Figure 7B:
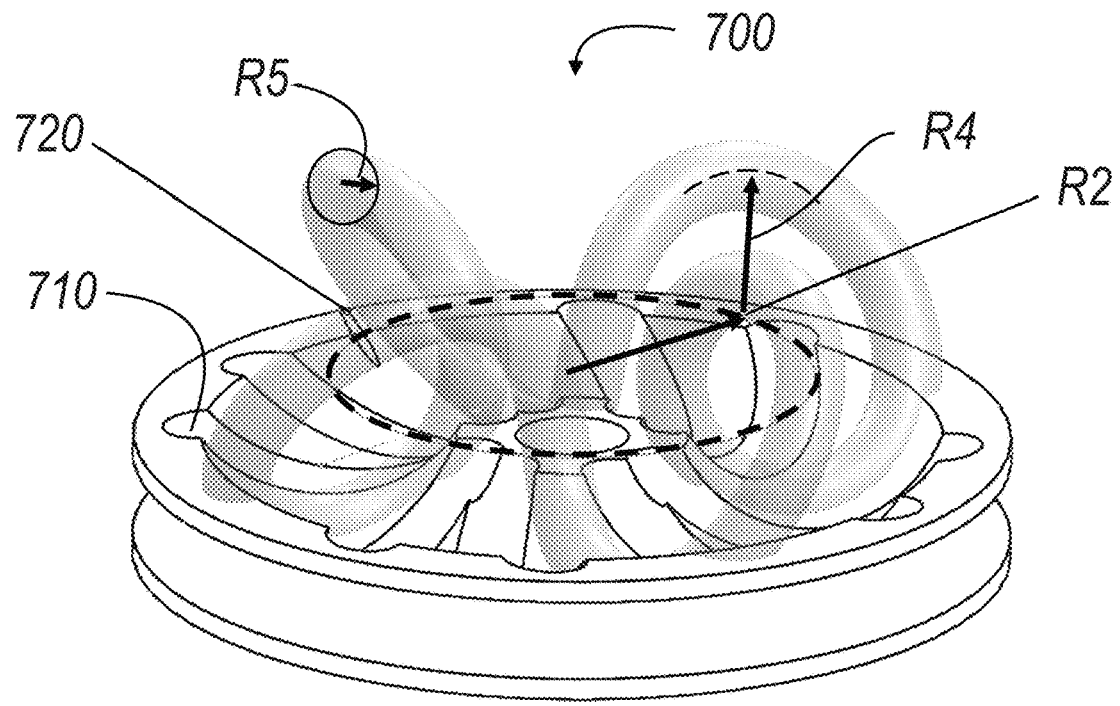
FIG. 7B illustrates an isometric top view of the embodiment of the output disc illustrated in FIG. 7A.

FIG. 7B illustrates an isometric top view of the embodiment of the output disc 700 illustrated in FIG. 7A. Generally speaking, the grooves 710 of the output disc 700 follow the shape of a curved three-dimensional spiral, specifically, a toroidal helix, wrapped around a center of rotation of the output disc 700, similar to an arc spring structure. The radius of curvature for the toroidal helixes wrapped around this central axis of rotation is shown as radius $R_2$. Additionally, each turn or coil of the toroidal helix shape that defines the grooves 710 have a curvature when viewed directly from above. This radius of curvature is shown as radius $R_3$ in FIG. 7A.

As with the grooves in the input discs discussed above, the toroidal helical shapes defining the grooves 710 define a curvature when viewing the cross-sectional profile of the output disc 700, where the shallow edges of the curvature are proximate to both the center and outer edge of the output disc 700, and the deepest point of the curvature is midway between the center and outer edge of the output disc 700. As such, the radius of this curvature is shown as radius $R_4$, and is also equal to the radius of curvature of the power discs (e.g., power disc 230 in FIG. 2) to be used with the output disc 700 as measured from the rotational axis of the power disc to the centers of the plurality of spherical features carried on the outer surface of each power disc (shown below as well). FIG. 7B illustrates phantom three-dimensional curved toroidal helical structures that define the radius of curvature $R_4$ of the grooves 710, where planes defined by these two radii of curvature $R_2$, $R_4$ of the grooves 710 are perpendicularly oriented, and a plane defined by radius of curvature $R_3$ is parallel with the plane of $R_2$, and thus also perpendicular to the plane defined by $R_4$.

Also, the phantom toroidal helical wraps that form the shape of the grooves 710 comprise an even number of rotational cycles for a given 360 degree rotation of the output disc 700. Additionally, the three-dimensional toroidal helix-shapes have multiple start points that correspond to the number of spherical features in each of the of power discs present in the drive core, and thus are in reality multiple toroidal helixes intertwined together and wrapped around the center axis of rotation of the output disc 700. The number of cycles affects the overall reduction ratio of the disclosed synchronic drive, just as how the pitch of the Archimedean spiral (i.e., the "tightness" of the spiral) providing the grooves in an input disc changes the rotational ratio. For example, a fine pitch on the spiral grooves of the input disc coupled with a large number of output cycles in the grooves of the output disc results in a higher overall reduction ratio. Conversely, the opposite is true.

Furthermore, the channels or grooves 710 formed along the curved helical shape also comprise a groove curvature (defining a groove width) 720 such that it has a partial-circular or semi-circular cross-sectional profile. More specifically, in such embodiments, the radius of curvature $R_5$ of the groove's 710 profile is substantially equal to the radius of the spherical features (e.g., features 230A in FIG. 2), or 1-3 thousandths of an inch larger than the radius of the spherical features, so as to receive the spherical features within the grooves 710 and still allow rolling movement of the spherical features within the grooves 710. Alternatively, the cross-sectional profile of the grooves 710 may comprise a Gothic Arch-shape. As before, the less play between the spherical features on the power discs and the curved walls of the grooves 710, the better, while still permitting rolling movement within the grooves 710.

Figure 8A:
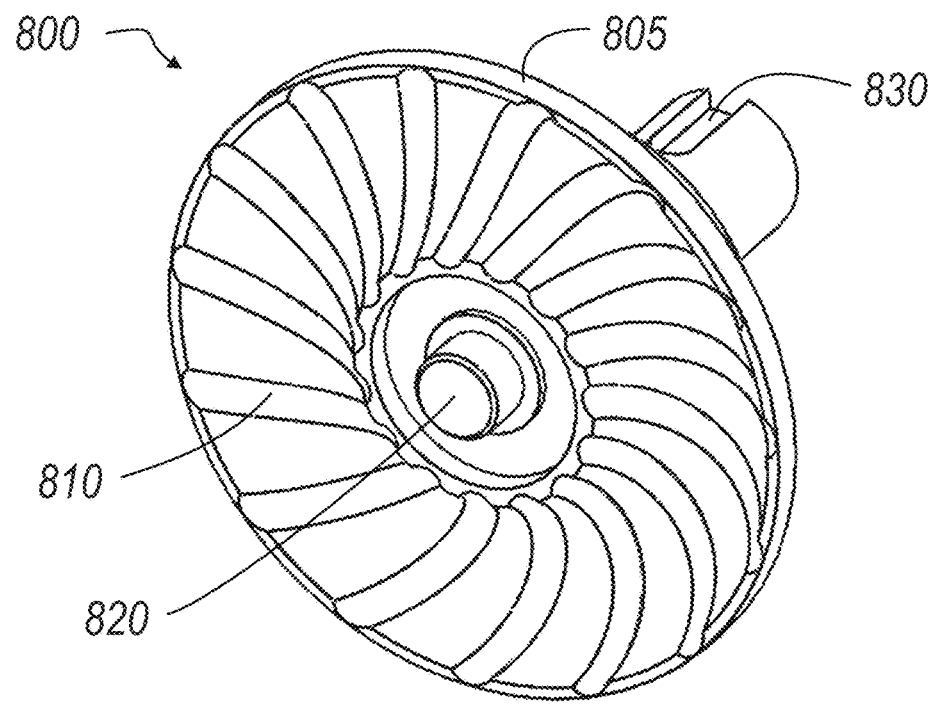
FIG. 8A illustrates a front isometric view of another embodiment of an output disc assembly for a synchronic drive in accordance with the disclosed principles.

FIG. 8A illustrates a front isometric view of another embodiment of an output disc assembly for a synchronic drive constructed in accordance with the disclosed principles. This embodiment of the output disc assembly 800 includes another embodiment of an output disc 805. This output disc 805 again includes grooves 810 having three radii of curvature corresponding to the radii of curvature discussed above with respect to FIGS. 7A and 7B.

Specifically, the grooves 810 comprise a radius of curvature $R_2$ defined by the helixes wrapped around a center of rotation of the output disc 805, a radius of curvature $R_3$ defining the curvature of each groove 810 when viewed directly from above, and a radius of curvature $R_4$ of the grooves 810 when viewing the cross-sectional profile of the output disc 805 which is equal to the radius of curvature of the power discs (e.g., power disc 230 in FIG. 2) to be used with the output disc 805 as measured from the rotational axis of the power disc to the centers of the plurality of spherical features carried on the outer surface of each power disc (shown below). As with all embodiments of output discs designed and constructed in accordance with the disclosed principles, the planes defined by the radii of curvature $R_2$ and $R_4$ of the grooves 810 are perpendicular, and the plane defined by radius of curvature $R_3$ is parallel with the plane defined by $R_2$ but perpendicular to the plane defined by $R_4$.

Figure 8B:
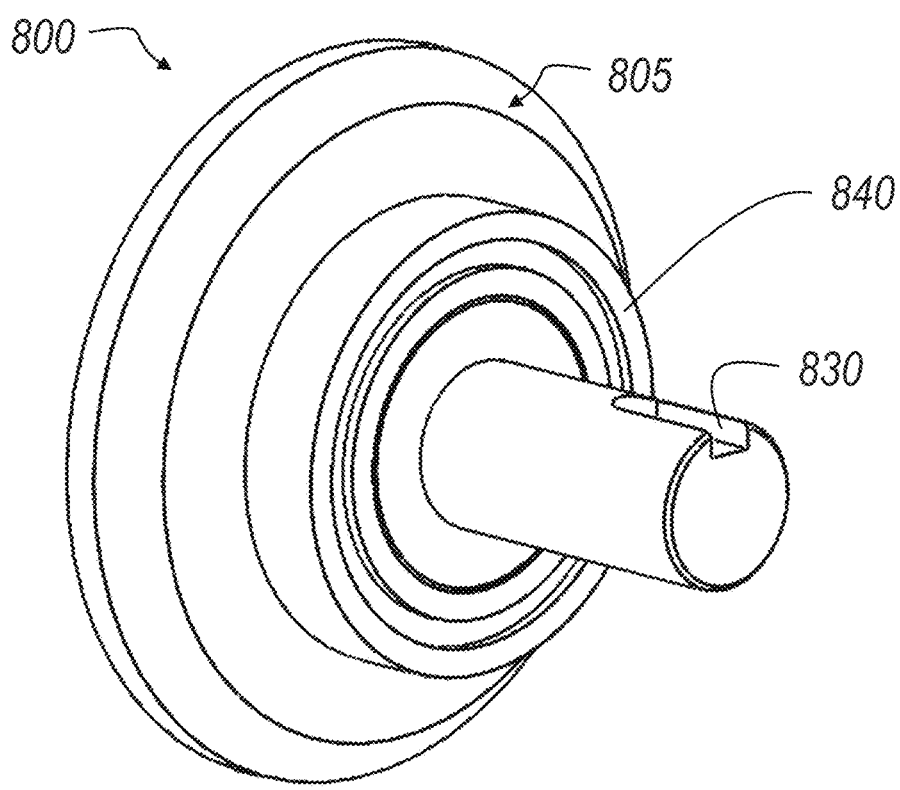
FIG. 8B illustrates a rear isometric view of the embodiment of the output disc assembly illustrated in FIG. 8A.

An output drive shaft 820 positioned and secured within a center bore of the output disc 805 is also provided in the assembly 800 of FIG. 8A. A coupling end 830 of the output drive shaft 820 is also illustrated, along with a keyway formed in the coupling end 830 for eliminating rotational slippage when the output drive shaft 820 is coupled to a device (not illustrated) receiving the output drive force of the output disc 805. FIG. 8B illustrates a rear isometric view of the embodiment of the output disc assembly 800 illustrated in FIG. 8A. From this view, the coupling end 830 of the output drive shaft 820 is fully visible, as is a contact bearing 840 mounted to an exterior of the rear end of the output disc 805. Such a bearing 840 may be employed when the output disc assembly 800 is mounted in a housing, an embodiment of which is discussed in further detail below.

In some embodiments, an output disc in accordance with the disclosed principles may also be configured to also function as a second input disc for a second stage in a stacked synchronic drive design. Specifically, as the interior face of the output disc is driven by the drive core based on a rotational input force at the input disc, an exterior face of the output disc can comprise an interior or driving face of what is effectively a second input disc, such as with a second Archimedean spiral formed therein in the same manner as discussed above. That second drive face would then serve as the rotational input for a second drive core, which can again comprise an index plate(s) and one or more power discs. That second drive core would then be configured to drive a second output disc designed and constructed as discussed herein. The second output disc may then include an output shaft, such as output shaft 830, for use in coupling the dual or stacked synchronic drive to a device or machine driven by its output shaft. In some embodiments, the pitches and sizes of the grooves formed in an Archimedean spiral on the exterior face of the output disc are substantially the same as those on the interior face of the original input disc, and similarly, the pitches and sizes of the grooves on the second output disc are substantially the same as those on the interface of the original output disc. In other embodiments, the pitches and/or sizes of the grooves of either the exterior face of the first output disc or the interior face of the second output disc are different than their original counterparts.

Figure 9A:
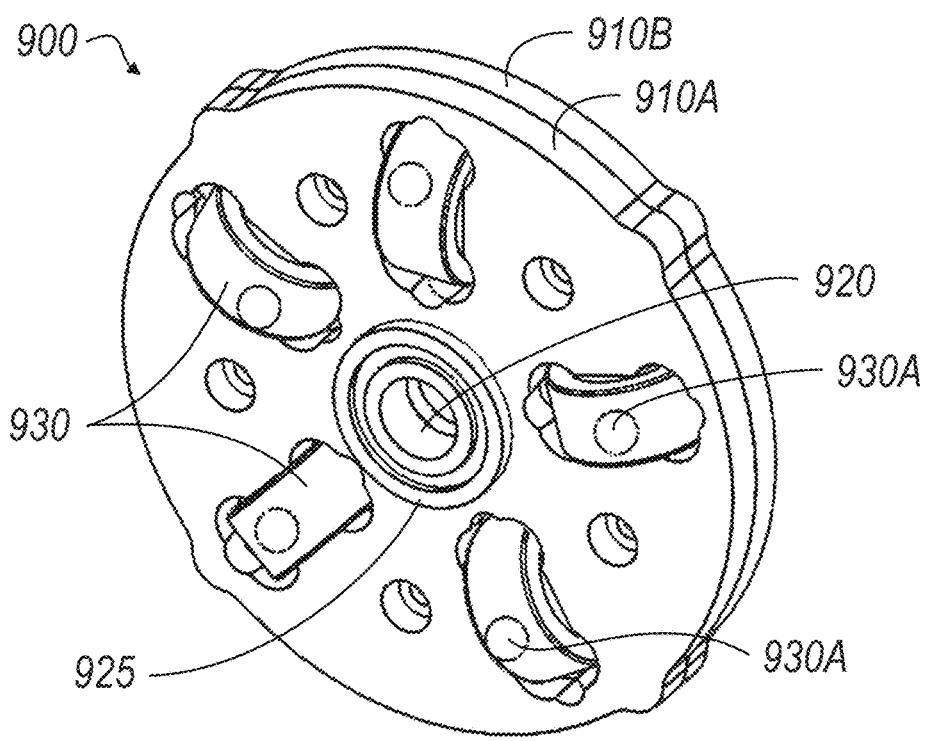
FIG. 9A illustrates an isometric view of one embodiment of a drive core for use within a synchronic drive in accordance with the disclosed principles.

Turning now to FIG. 9A, illustrated is an isometric view of one embodiment of a drive core 900 of a synchronic drive designed and constructed in accordance with the disclosed principles. This embodiment of a drive core 900 comprises first and second indexing plates 910A, 910B (collectively 910) having a core central bore 920 formed through their centers. The core central bore 920 may be provided to receive a drive shaft (not illustrated) therethrough and on which the drive core 900 may be mounted. In such embodiments, the central bore 920 may include one or more bearings 925, which may comprise a ball bearing or a roller bearing, to reduce rotational friction and play for the drive core 900 about a central shaft placed through the bore 920.

Also illustrated in the drive core 900 of FIG. 9A are a plurality of power discs 930, similar to the power discs 230 discussed above with reference to FIG. 2. While a drive core 900 with five power discs 930 is illustrated, any number of power discs may be employed in a drive core as disclosed herein, depending on the application and/or desired construction of the corresponding synchronous drive. For example, a single power disc may be employed so long as the required number of spherical elements are carried on the exterior of that single power disc. By employing multiple power discs, load sharing of the forces present within a synchronic drive as disclosed herein can increase the load capability of the drive. Moreover, the number of power discs can be increased as the diameter of the synchronic drive is increased for increased load sharing. Also contributing to increased load capability is the improved Hertzian contact geometry provided via the spherical features in a corresponding cup-shape formed in the rotation surface of the power discs.

Each of these power discs 930 in the drive core 900 is configured to rotate about a pivot shaft (not illustrated; see FIG. 9D) as the synchronic drive in which the drive core 900 operates is rotated. Each of the power discs 930 carries a plurality of spherical features 930A on their exterior surfaces, which are sized to be received within the grooves of an input disc (not illustrated) and the grooves of an output disc (not illustrated) of a synchronic drive as disclosed herein. In exemplary embodiments, the spherical features 930A are ball bearings that sized as described above, and in some such embodiments, the outer surfaces of the power discs 930 comprise recesses sized and configured to receive corresponding spherical features 930A therein.

Figure 9B:
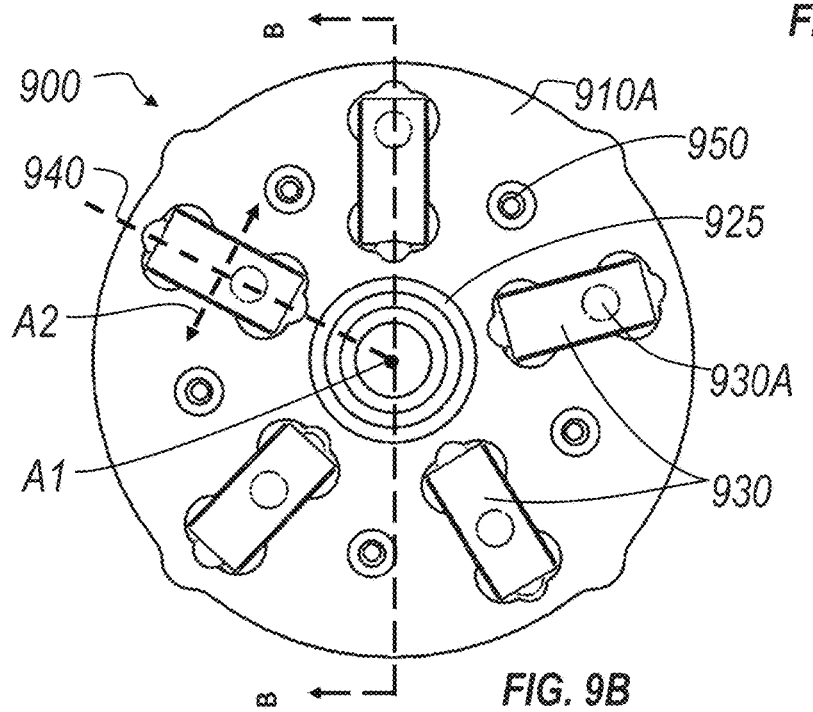
FIG. 9B illustrates a front view of the embodiment of the drive core illustrated in FIG. 9A.

Looking briefly at FIG. 9B illustrates a front view of the embodiment of the drive core 900 illustrated in FIG. 9A. This front view provides additional details of the orientation of the power discs 930 within the drive core 900. Specifically, all of the power discs 930 are oriented within the indexing plates 910 such that the rotational plane 940 of each power disc 930 intersects with the central axis of rotation $A_1$ of the drive core 900. Each of the power discs 930 then rotate about their corresponding axis of rotation $A_2$ as the synchronic drive is operated. Also illustrated in FIG. 9B are fastener holes 950, which may be used to secure the first and second indexing plates 910A, 910B to one another when the drive core 900 is assembled.

Figure 9C:
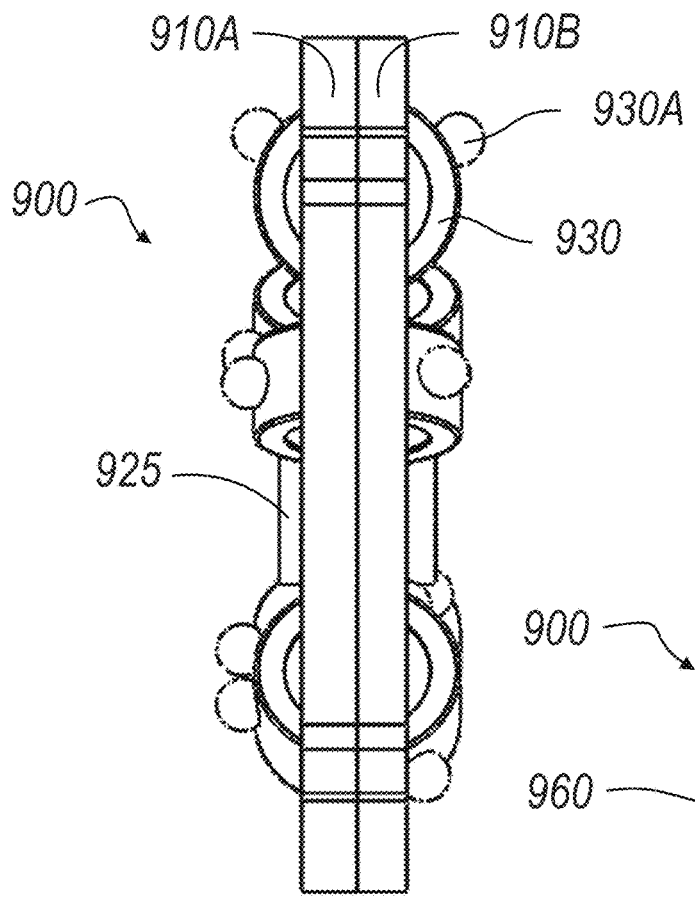
FIG. 9C illustrates a side view of the embodiment of drive core illustrated in FIGS. 9A and 9B.

FIG. 9C illustrates a side view of the embodiment of the drive core 900 illustrated in FIGS. 9A and 9B. This side view once again illustrates the first and second indexing plates 910A, 910B, as well as the power discs 930, and the spherical features 930A carried thereon, mounted within the indexing plates 910A, 910B. More specifically, in exemplary embodiments, each power disc 930 may be mounted on a pivot shaft (not illustrated; see FIG. 9D) about which each power disc 930 rotates. These pivot shafts may be secured in position using the indexing plates 910A, 910B, for example, by sandwiching the pivot shafts in appropriately sized slots formed in the each of the indexing plates 910A, 910B such that when the indexing plates 910A, 910B are secured to one another, the pivot shafts are held in place. In alternative embodiments, rather than sandwiching the pivot shafts between two halves of an indexing plate, a single-piece indexing plate may be employed with cross-drilled holes placed therein to accept the pivot shafts of the power discs 930. With these pivot shafts secured in place, the power discs 930 are free to rotate about the pivot shafts within the indexing plates 910A, 910B, while maintaining their proper orientation within the drive core 900.

Figure 9D:
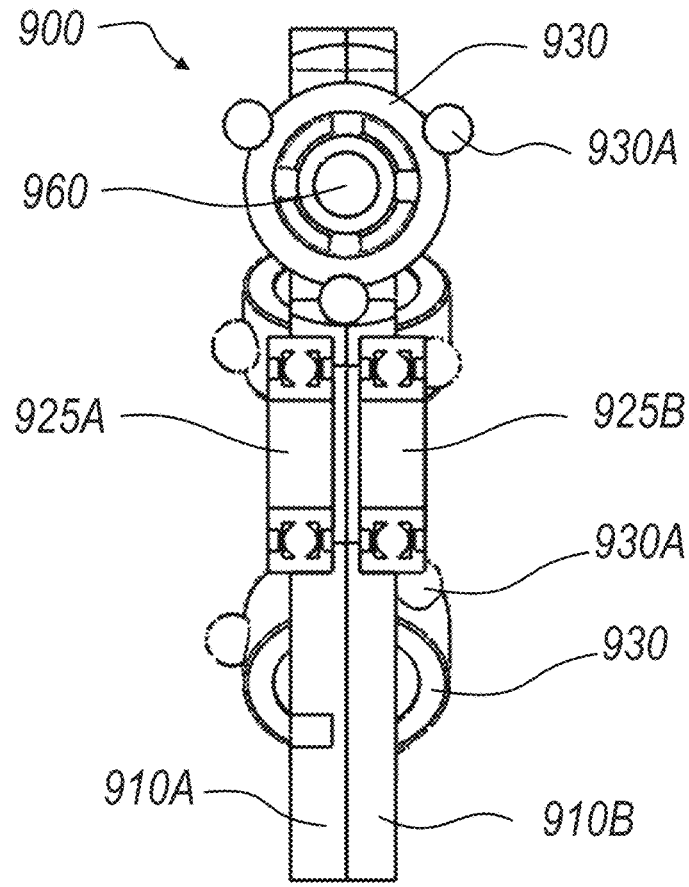
FIG. 9D illustrates a cross-sectional view taken along line B-B of the embodiment of the drive core illustrated in FIG. 9B.

FIG. 9D illustrates a cross-sectional view taken along line B-B of the embodiment of indexing plates 910A, 910B illustrated in FIG. 9B. This cross-sectional view again illustrates the first and second indexing plates 910A, 910B, as well as first and second bearings 925A, 925B disposed in the central bore of the indexing plates 910A, 910B. Additionally, a pivot shaft 960 of one of the power discs 930 is illustrated in cross-section, as well as the spherical features 930A of a single power disc 930 and the corresponding recesses formed into the outer surface of this power disc 930. Another advantage available with a synchronic drive as disclosed herein is a reduction in noise during operation. Conventional geared drive systems typically have a certain amount of noise associated with their operation. However, with the rolling contact of the power discs between the input and output discs, such operational noise is greatly reduced over traditional geared drive systems. Additionally, the rolling nature of spherical features in grooves formed in the rotation exterior surface of the power discs reduces friction and contact loading. Moreover, one or more of the input disc, power discs, and output disc may be coated with low-friction coatings to reduce wear and increase efficiency further.

Figures 10A, 10B:
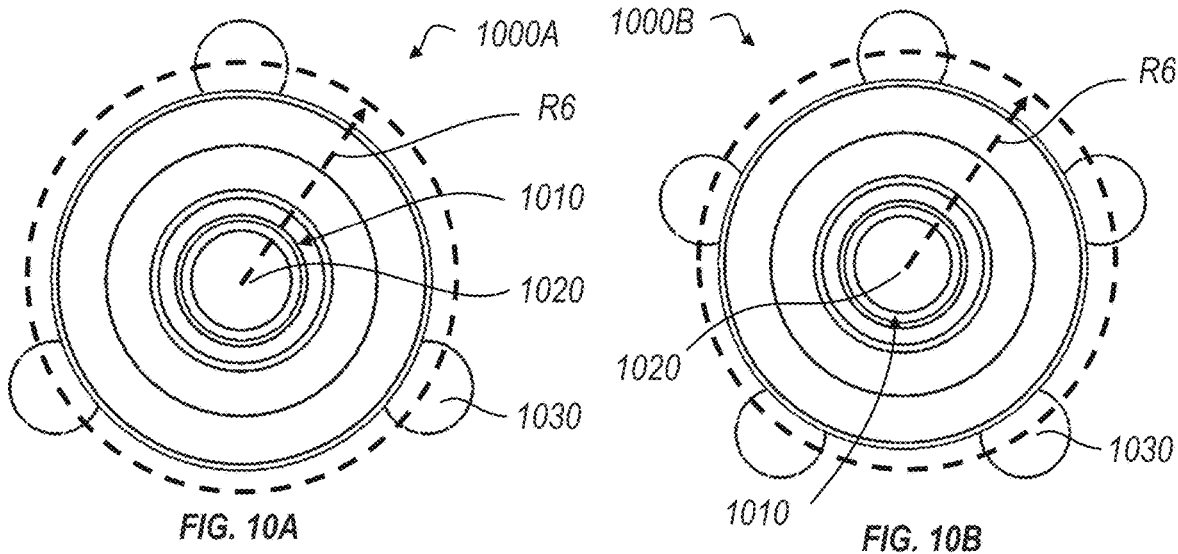
FIG. 10A illustrates a front view of one embodiment of a power disc for use with a synchronic drive in accordance with the disclosed principles.
FIG. 10B illustrates a front view of another embodiment of a power disc for use with a synchronic drive in accordance with the disclosed principles.

Referring now to FIG. 10A illustrates a front view of one embodiment of a power disc 1000A for use with a synchronic drive constructed in accordance with the disclosed principles. The exemplary power disc 1000A comprises a central bore 1010 having a pivot shaft or pin 1020 positioned therein. In exemplary embodiments, the pivot pin 1020 is placed within the central bore 1010 using a press or friction fit. In such embodiments, the power disc 1000A comprises a bearing of some type, where its center may be held in a single place while the outer portion of power disc 1000A rotated about a central axis of rotation (see FIG. 9B). As such, the power disc 1000A may be embodied as a ball bearing or a roller bearing, or any other embodiment of a bearing or similar device that provides rotation about a centrally located pivot shaft 1020 while carrying a plurality of spherical features 1030 on its outer surface. The partial recess of the spherical features 1030 into the outer surface of the power disc 1000A is also shown.

FIG. 10B illustrates a front view of another embodiment of a power disc 1000B for use with a synchronic drive constructed in accordance with the disclosed principles. This embodiment of a power disc 1000B again comprises a central bore 1010 receiving a pivot shaft 1020 therein, typically using a press or friction fit. The power disc 1000B also includes a plurality of spherical features 1030 carried on its outer surface, where the recess of the spherical features 1030 into the outer surface of the power disc 1000B is again seen.

Power discs in accordance with the disclosed principles, such as power disc 1000A and power disc 1000B (collectively 1000), comprise a radius of curvature $R_6$ measured from the rotational axis of the power disc 1000 about its pivot shaft 1020, to the centers of the plurality of spherical features 1030 carried on the outer surface of the power disc 1000. As mentioned above, the radius of curvature $R_1$ of the Archimedean spiral that forms the grooves of an input disc equals the radius of curvature $R_6$ of the power disc 1000 mating with that input disc. Moreover, the radius of curvature $R_4$ of the curved helical-shaped grooves of an output disc also equals the radius of curvature $R_6$ of the power discs 1000 mating with the output disc. With these matching radii of curvature between the grooves of an input disc and the power discs of the drive core, and between the grooves of an output disc and the power discs, results in the spherical features 1030 of the power discs 1000 being received within those two collections of grooves, when rotating, so as to provide the translation of rotational movement of the input disc into a lifting force of the power discs, and the translation of that lifting force of the power discs into a rotational force of the output disc.

Figures 11A, 11B:
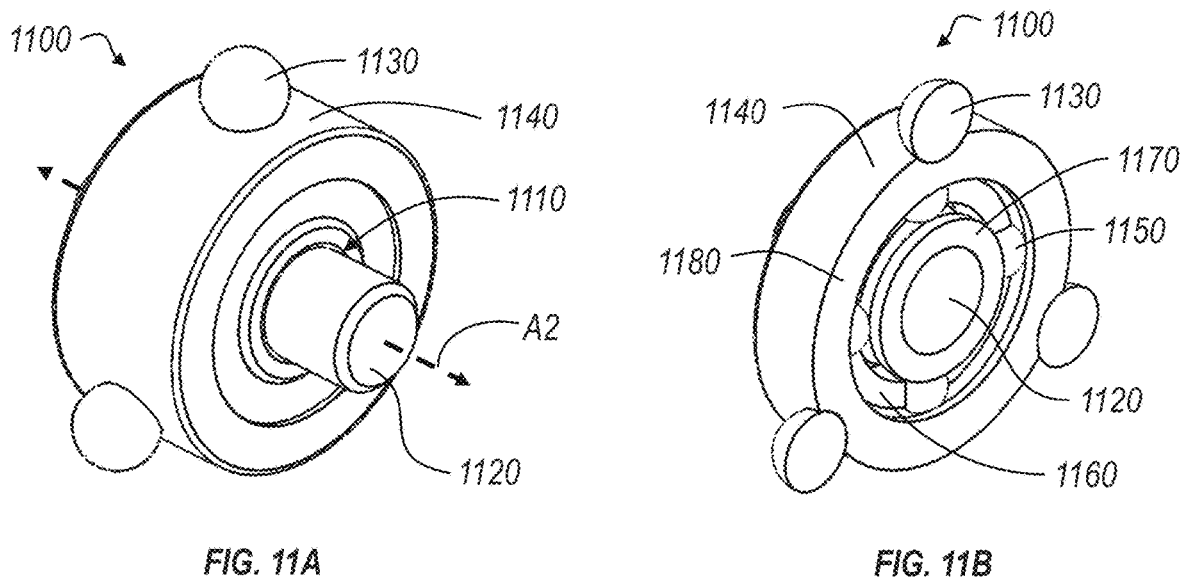
FIG. 11A illustrates an isometric view of another embodiment of a power disc for use with a synchronic drive in accordance with the disclosed principles.
FIG. 11B illustrates an isometric cross-sectional view of the embodiment of the power disc illustrated in FIG. 11A.

Looking now at FIG. 11A, illustrated is an isometric view of another embodiment of a power disc 1100 for use with a synchronic drive constructed in accordance with the disclosed principles. This embodiment of the power disc 1100 may again be comprised as a ball bearing, roller bearing, or other similar device. The power disc 1100 again includes a central bore 1110 into which a pivot shaft 1120 is affixed or otherwise located, and which provides an axis of rotation $A_2$ about which the power disc 1100 rotates during operation of a synchronic drive as disclosed herein. This embodiment of a power disc 1100 again includes a plurality of spherical features 1130 carried on its outer surface 1140, where the recess of the spherical features 1130 into the outer surface 1140 of the power disc 1100 is also shown.

FIG. 11B illustrates an isometric cross-sectional view of the embodiment of the power disc 1100 illustrated in FIG. 11A. This cross-sectional view is taken along a line cut along a plane perpendicular to the axis of rotation $A_2$ of the power disc 1100. In this cross-sectional view, the central bore 1110 receiving pivot shaft 1120 therein is visible. Additionally, the plurality of spherical features 1130 carried on outer surface 1140 are illustrated, where the recess of the spherical features 1130 into the outer surface 1140 of the power disc 1100 is also illustrated. Also visible in the view of FIG. 11B are a plurality of ball bearings 1150 and corresponding spacers 1160 maintaining the position of the ball bearings 1150 within the power disc 1100. The ball bearings 1150 are held between an inner portion 1170 and an outer portion 1180, and thereby roll/rotate between the inner and outer portions 1170, 1180 within grooves formed in both portions 1170, 1180, as the power disc 1100 is rotated within a synchronic drive during its operation.

Referring now to FIG. 11C, illustrated is a front cross-sectional view of the embodiment of a power disc 1100 illustrated in FIGS. 11A-11B. This cross-sectional view is taken along a line cut along a plane defined by the axis of rotation $A_2$ of the power disc 1100. In this cross-sectional view, the central bore 1110 receiving pivot shaft 1120 therein is again visible. Additionally, the plurality of spherical features 1130 carried on outer surface 1140 are shown, as well as the recess 1160 formed into the outer surface 1140 of the power disc 1100 to receive the spherical features 1130. Also visible in this cross-sectional view are a plurality of ball bearings 1150 held between an inner portion 1170 and an outer portion 1180 to roll/rotate therebetween within grooves 1190 formed in both inner and outer portions 1170, 1180 when the power disc 1100 is rotated.

Looking now at FIG. 12A, illustrated is an alternative embodiment of a power disc 1200A. In this embodiment, the power disc 1200A again includes an internal surface 1210 defined by a central bore 1220 through which a pivot shaft (not illustrated) is positioned. In some embodiments, the pivot shaft is positioned through central bore 1220 of the power disc 1200A with a slip fit such that the internal surface 1210 of the power disc 1200A may slidably rotate about the pivot shaft. In other embodiments, the central bore 1220 of the power disc 1200A may comprise a bearing, such as a ball bearing or roller bearing, through which the pivot shaft is placed, and which would permit rotation of the power disc 1200A about the pivot shaft with less friction than a slip fit.

This embodiment of a power disc 1200A in accordance with the disclosed principles comprises extending arms 1230, which extend radially from the exterior surface 1240 of the power disc 1200A. By extending radially, the longitudinal axis of each arm 1230 intersects with the axis of rotation of the power disc 1200A about the pivot shaft. Additionally, each arm 1230 comprises an engaging contact feature 1230A located on the distal end of each arm 1230, where each feature 1230A is configured to be received within the grooves of both an input disc and an output disc as disclosed herein. In some embodiments, the features 1230A are hemispherical in shape, while in other embodiments the features 1230A have a paraboloid shape. Of course, any advantageous shape for the features 1230A, as well as for the corresponding grooves configured to receive the features 1230A therein, may be employed with a synchronic drive as disclosed herein.

Additionally, in some embodiments, the features 1230A may be movably coupled to each's corresponding arm 1230, for example, such that each feature 1230A can rotate about the longitudinal axis of its corresponding arm 1230. In other embodiments, the features 1230A may simply be affixed in place on their corresponding arms 1230. In yet other embodiments, the features 1230A may be constructed from a hardened material, such as high-speed steel or another high hardness metal, while the arms 1230 are constructed from a softer and/or lighter material. For example, the arms 1230 may be constructed of plastic, while the features 1230A are constructed of hardened steel, in order to reduce weight and cost of a synchronic drive employing this embodiment of a power disc 1200A. In other embodiments, both the arms 1230 and the features 1230A are constructed of a high hardness metal, and in more specific embodiments, body of the power disc 1200 as well as the arms 1230 and features 1230A are all constructed if a high hardness metal. In sum, each of the components comprising a power disc 1200A of the type shown in FIG. 12A may be constructed from any advantageous material, which may be selected based on the particular application of the power disc 1200A.

Looking briefly at FIG. 12B, illustrated is an alternative embodiment of a power disc 1200B, similar to the power disc 1200A illustrated in FIG. 12A. This embodiment of a power disc 1200B again includes a main body having an internal surface 1210 defined by a central bore 1220 through which a pivot shaft (not illustrated) is received. As with the embodiment of FIG. 12A, this embodiment of a power disc 1200B may also be mounted on its pivot shaft using a slip fit, or a bearing of some type may also be employed.

This exemplary embodiment comprises five arms 1230 extending from the external surface 1240 of the power disc 1200B, rather than the three arms provided by the embodiment illustrated in FIG. 12A. Also as before, the arms 1230 comprise rounded or curved features 1230A positioned at the distal ends of each of the extending arms 1230. These features 1230A may again be provided in a hemispherical shape, a paraboloid shape, or any other advantageous shape configured to correspond to the shape of the grooves formed in the input and output discs in which the power discs 1200B will be placed. Additionally, the engaging features 1230A may be movably coupled to their corresponding arms 1230, or may be immovably affixed thereto. Also, the arms 1230 and engaging features 1230A in either the embodiment of FIG. 12A or 12B may simply be formed as a single unitary component, such as entirely from plastic or entirely from metal, as desired. Not limitation to any particular material is required, And material selection of some or all components comprising a power disc as disclosed herein may be selected based on application of the synchronic drive into which the power disc will be placed.

Figure 13:
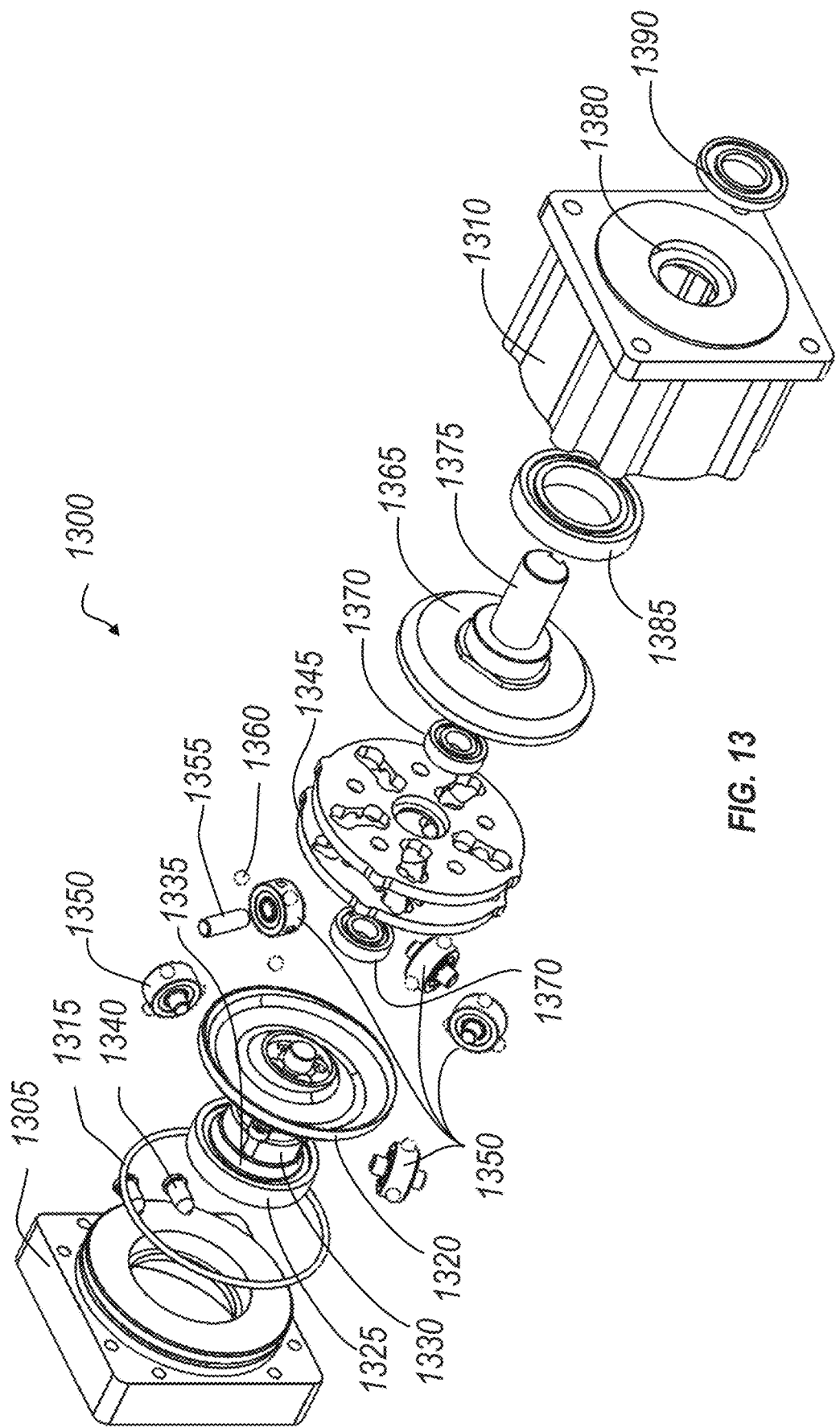
FIG. 13 illustrates an exploded isometric view of a NEMA-compliant embodiment of a synchronic drive assembly in accordance with the disclosed principles.

Turning now to FIG. 13, illustrated is an exploded isometric view of a NEMA-compliant embodiment of a synchronic drive assembly 1300 designed and constructed in accordance with the disclosed principles. Although this illustrated embodiment of a synchronic drive assembly 1300 is configured with specification established by the National Electrical Manufacturers Association (NEMA), the fundamental principles and components of the synchronic drive within the synchronic drive assembly 1300 remain the same.

The synchronic drive within the synchronic drive assembly 1300 is supported at the back end by an aft motor adapter 1305, and is supported at the front end and housed within a forward housing 1310. An O-ring 1315 or other seal may be provided to seal the forward housing 1310 to the aft motor adapter 1305. An input disc 1320 is supported within the motor adapter 1305 with a contact bearing 1325 having an inner diameter sized to receive (e.g., via press fit) a shoulder on the exterior surface of the input disc 1320, and an outer diameter sized to be received (e.g., via press fit) within a bore of the aft motor adapter 1305. Also included is a motor shaft coupling 1330 sized and configured to couple, at a first end, to an input shaft affixed to the rotational center of the input disc 1320, and to couple, at a second opposing end and via an adapter plate 1335, to a drive source such as the shaft of a drive motor (not illustrated). Other examples of devices that may provide input rotational force onto the input disc 1320 are a hand crank, an electric servo motor, an air motor, or an engine of some type. Of course, any type of device or machine may be employed to provide the input rotational force to the assembly 1300. Additionally, the motor shaft coupling 1330 is configured to be positioned outside of the aft motor adapter 1305 so as not to interfere with rotation of the synchronic drive components. Also illustrated is a coupling plug 1340 that can be employed with the motor shaft coupling 1330, such as to prevent debris from accumulating in recesses on the coupling 1330.

Also illustrated in FIG. 13 are first and second halves of an indexing plate 1345, which are joined together to carry a plurality of power discs 1350 when the drive core of the synchronic drive is assembled. Among the power discs 1350, the pivot shafts 1355 on which the power discs 1350 rotate are also shown, as well as the spherical features 1360 carried on the exterior surfaces of the power discs 1350 and received into the grooves of the input disc 1320 and an output disc 1365. Smaller contact bearings 1370 installed on both sides of the indexing plate 1345 are also illustrated and on which the drive core is configured to rotate.

As the input disc 1320 is rotated by an input rotational force, the power discs 1350 are driven in the manner discussed in detail above. The output disc 1365, in turn, is driven by that movement (i.e., individual rotations) of the power discs 1350. Mounted to the output disc 1365 is an output shaft 1375, which is rotated as the output disc 1365 is rotated to provide an output rotational force from the synchronic drive assembly 1300. The output shaft 1375 is sized and configured extend outside the forward housing 1310 via a central bore 1380 in the housing 1310 so that a receiving device (not illustrated) coupled to the output shaft 1375 is driven by its rotational force. In some embodiments, a keyed shaft (such as that used on a servo motor) or a flanged shaft can be used at the output shaft 1375. Additionally, in some embodiments a pinion gear, spur gear, belt pulley, roller, drive wheel or other component may be mounted on the output shaft 1375. A forward contract bearing 1385 may be provided and coupled to an exterior face of the output disc 1365 to provide rotational support and stability during operation of the assembly 1300.

Additionally, a shaft seal 1390 may be provided at the exterior of bore 1380 of the forward housing 1310 to seal the interior of the assembly 1300 from contaminants, while permitted rotation of the output shaft 1375 during operation of the assembly 1300. In some embodiments, the housing employed with the synchronic drive assembly 1300 may be selected based on the use for the assembly. For example, a NEMA-compliant servo housing, a flanged housing (e.g., an ISO 4909-1 Flanged Housing for robotic arm use), large through-hole aperture housings for gimbals or robotic arm joints (see FIGS. 15A-D), or an offset motor housing for commercial vending applications may be employed.

Figure 14A:
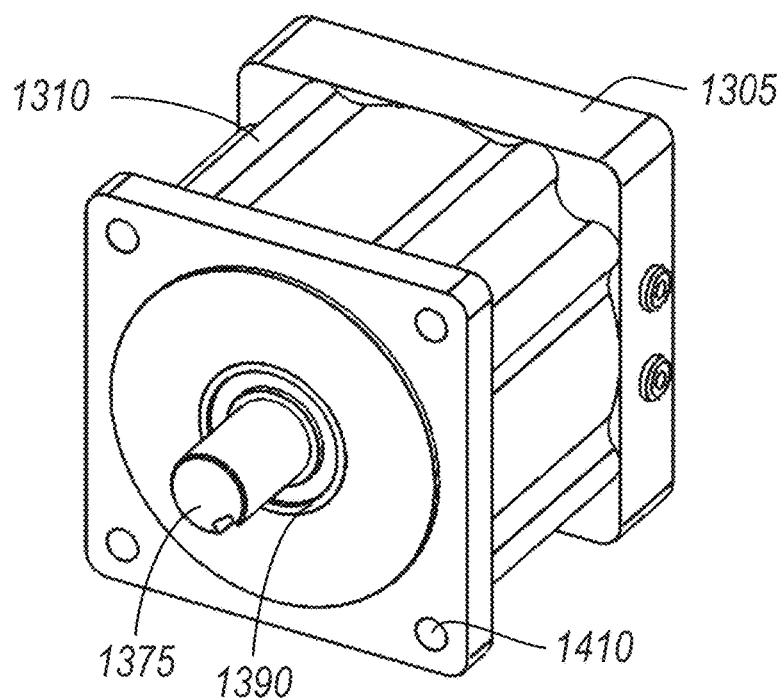
FIG. 14A illustrates an isometric view of an assembled NEMA-compliant embodiment of the synchronic drive assembly illustrated in FIG. 13.

FIG. 14A illustrates an isometric view of an assembled NEMA-compliant embodiment of the synchronic drive assembly 1300 illustrated in FIG. 13. This front isometric view illustrates the forward housing 1310 as well as portions of the aft motor adapter 1305. Also shown are the output shaft 1375, in this embodiment having a keyed end, and the shaft seal 1390. Mounting holes 1410 are also provided on the exterior corners of the forward housing 1310 for use in mounting the assembly 1300 to another device or component.

Figure 14B:
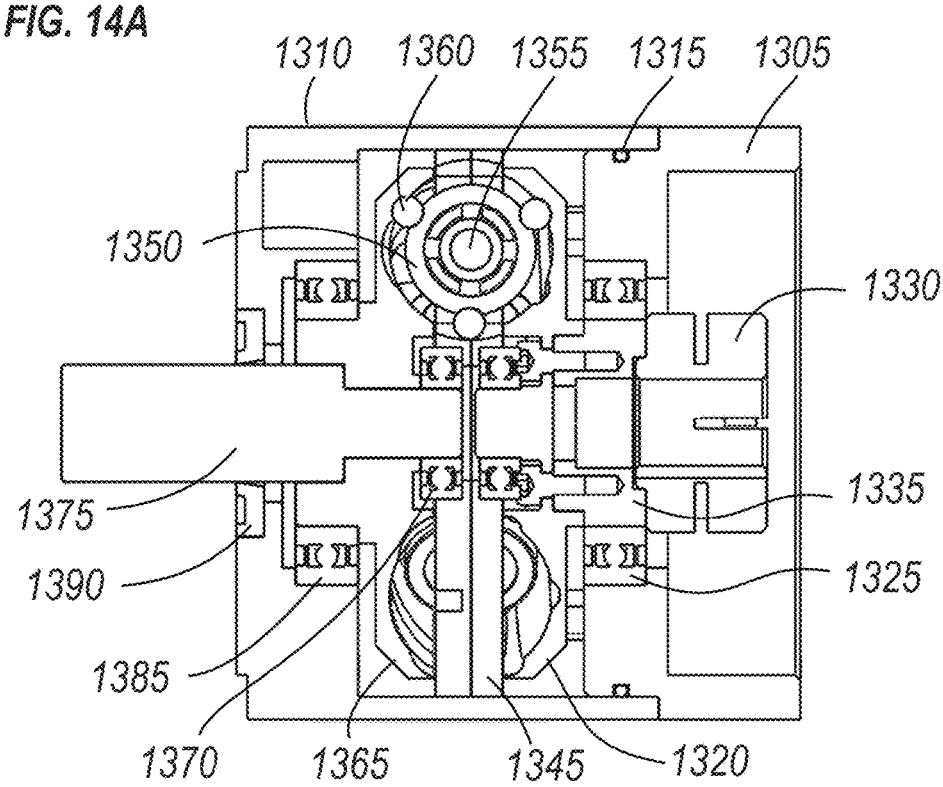
FIG. 14B illustrates a side cross-sectional view of the NEMA-compliant embodiment of a synchronic drive assembly illustrated in FIG. 14A.

FIG. 14B illustrates a side, partial cross-sectional view of the NEMA-compliant embodiment of the synchronic drive assembly 1300 illustrated in FIG. 14A. While from this cross-sectional view, the forward housing 1310 and aft motor adapter 1305 may again be seen, many of the internal components comprising the synchronic drive assembly 1300 are now also visible.

Specifically, the forward housing 1310 and the aft motor adapter 1305 enclosing the assembly 1300 are shown, as well as the O-ring 1315 providing a seal between the two. The input disc 1320 is also visible, as well as the contact bearing 1325 into which the input disc 1320 is mounted and the motor shaft coupling 1330 connected to the input shaft in the input disc 1320. Three of the power discs 1350 can also be seen within the drive core of the synchronic drive, as well as the pivot shafts 1355 on which the power discs 1350 rotate and the spherical features 1360 carried on the exterior surfaces of the power discs 1350 and received into the grooves of the input disc 1320 and an output disc 1365. Contact bearings 1370 installed on both sides of the indexing plate 1345 are also visible. The output shaft 1375, which is rotated as the output disc 1365 is rotated, can be seen extending outside the forward housing 1310 via the central bore 1380 in the housing 1310. The forward contract bearing 1385 is seen providing the rotational support and stability of the output disc 1365 during operation of the assembly 1300. Finally, the shaft seal 1390 providing a seal to the front end of the assembly 1300 can also be seen.

Figure 14C:
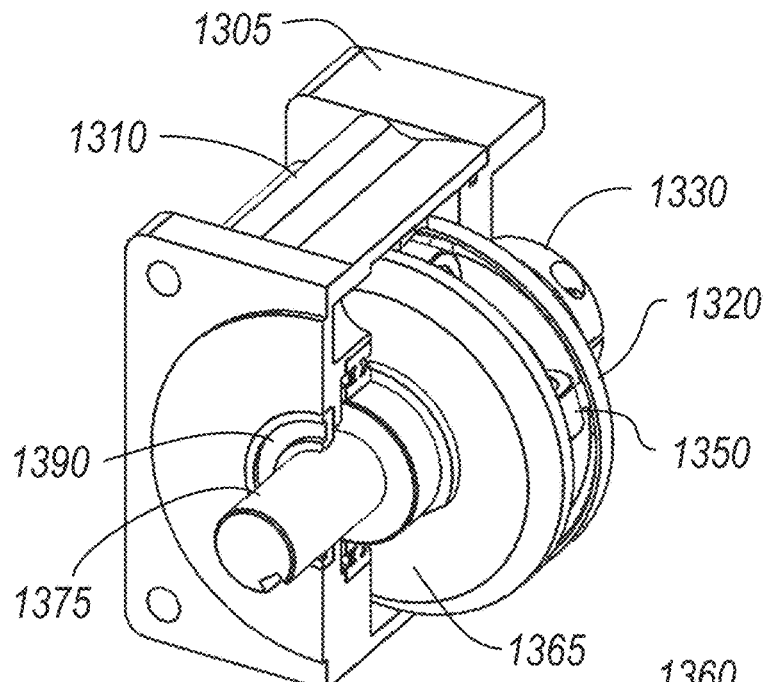
FIG. 14C illustrates an isometric cross-sectional view of the NEMA-compliant embodiment of a synchronic drive assembly illustrated in FIGS. 14A and 14B.
Figure 14D:
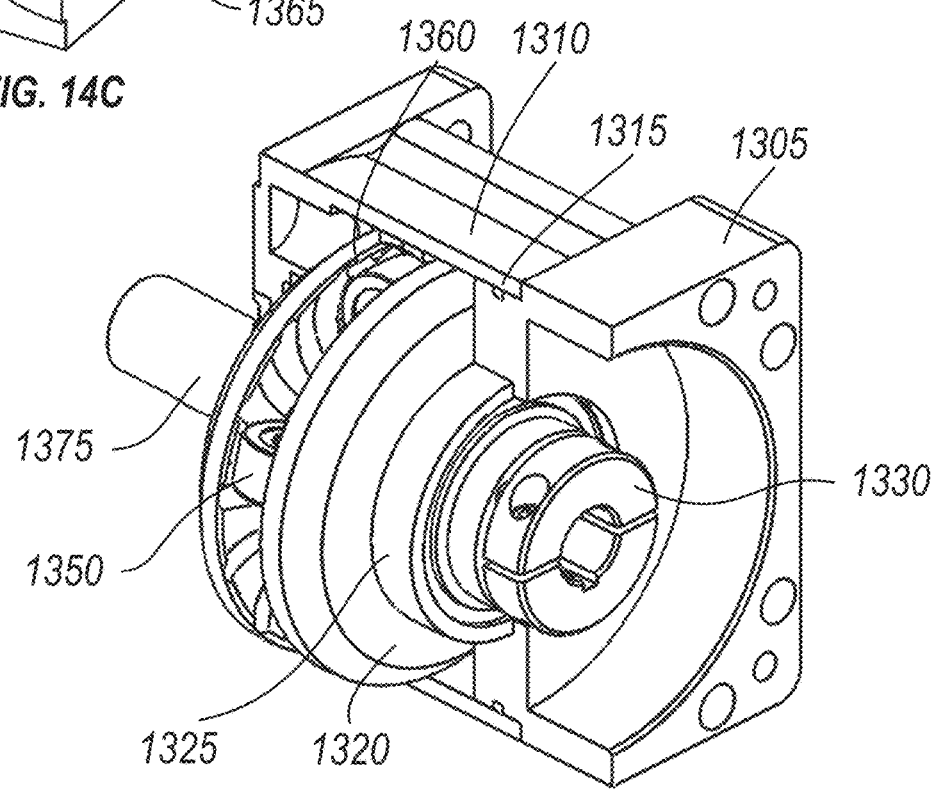
FIG. 14D illustrates another isometric cross-sectional view of the NEMA-compliant embodiment of a synchronic drive assembly illustrated in FIGS. 14A, 14B and 14C.

FIG. 14C illustrates a front isometric, partially cross-sectional view of the NEMA-compliant embodiment of a synchronic drive assembly illustrated in FIGS. 14A and 14B. FIG. 14D illustrates a rear isometric, partially cross-sectional view of the NEMA-compliant embodiment of a synchronic drive assembly illustrated in FIGS. 14A, 14B and 14C. From these additional partially cross-sectional views, visible again are the forward housing 1310 and aft motor adapter 1305 with O-ring 1315 sealing the two, the input disc 1320, contact bearing 1325, motor shaft coupling 1330 connected to the input shaft in the input disc 1320, and some of the power discs 1350 and their pivot shafts 1355 and spherical features 1360. Also visible are contact bearings 1370 installed on the indexing plate 1345, output shaft 1375, forward contract bearing 1385, and shaft seal 1390.

Figure 15D:
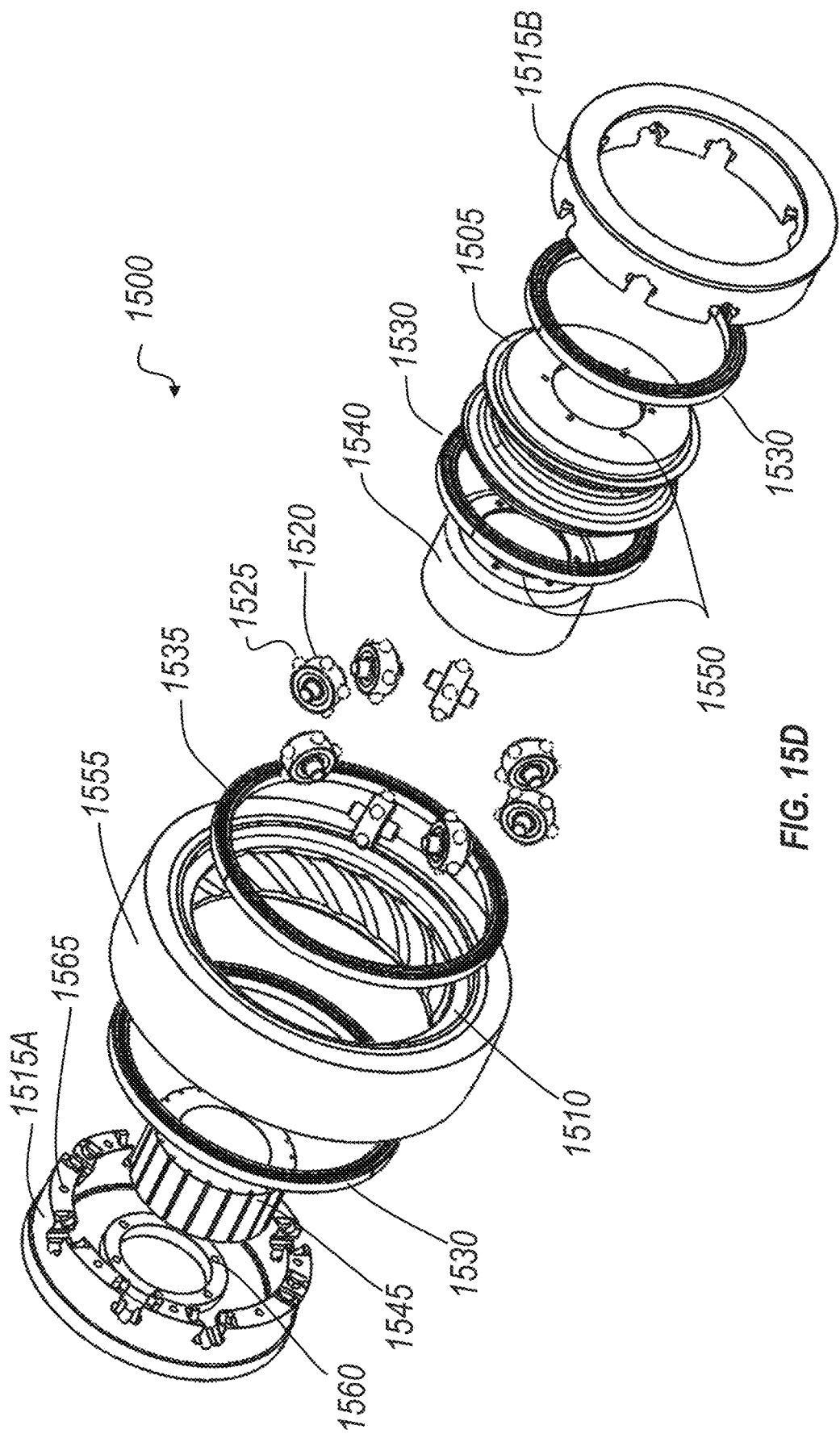
FIG. 15D illustrates an exploded isometric view of the large through hole version of a synchronic drive illustrated in FIGS. 15A, 15B and 15C.

Turning now to FIG. 15A, illustrated, is an isometric view of one embodiment of a large through hole version of a synchronic drive constructed in accordance with the disclosed principles adapted for use in an assembly 1500 comprising an electric drive wheel. FIG. 15B illustrates another isometric view of the embodiment of the large through hole version of the synchronic drive assembly 1500 illustrated in FIG. 15A. FIG. 15C illustrates a side cross-sectional view of the embodiment of the large through hole version of the synchronic drive assembly 1500 illustrated in FIGS. 15A and 15B. This embodiment of the synchronic drive assembly 1500 will be discussed with reference to FIGS. 15A-D collectively. FIG. 15D illustrates an exploded isometric view of the large through hole version of the synchronic drive assembly 1500 illustrated in FIGS. 15A, 15B and 15C.

For various applications, such as Automated Ground Vehicles, it is desirable to have the motor and reduction drive as short in length as possible. Conventional approaches usually have an electric motor attached to the end of a reduction drive, and, where several stages of planetary gear are employed, the length of the assembly can become excessively long. Additionally, such conventional designs tend to add weight, and displace volume that could be put to better use, such as battery capacity.

In one embodiment of a synchronic drive as disclosed herein, a disclosed synchronic drive may be configured to have a relatively large aperture in the center of a synchronic drive assembly 1500. This assembly 1500 may be comprising in an electric wheel of a vehicle, while achieving laudable single-stage reduction ratios that are not achievable in other devices such as a planetary gear box. The large aperture, when combined with a large aperture electric motor, such as Model #KM062 produced by Allied Motion, allows for high reduction ratios combined in a relatively short length and compact drive assembly. Thus, the entire reduction drive, motor, and wheel assembly can be contained in a single and lighter apparatus, with the added benefit of allowing control and signal wires to be routed through the aperture.

Such an exemplary embodiment of a short length, larger aperture synchronic drive assembly 1500 still includes a synchronic drive core having an input disc 1505 and an output disc 1510. The drive core also includes are first and second halves 1515A, 1515B of an indexing plate (collectively, 1515) configured to hold a plurality of power discs 1520. In this embodiment, eight power discs 1520 are employed; however, any other number of power discs 1520 may also be employed, as needed or desired. Each of the power discs 1520 again carry a plurality of spherical features 1525, which in this embodiment comprises 5 spherical features 1525 on each power disc 1520. Of course, other numbers of spherical features 1525 may also be employed in related embodiments.

Rotation of the input disc 1505 relative to the indexing plate 1515 may be provided by a pair of internal angular contact bearings (collectively, 1530), while rotation of the output disc 1510 relative to the indexing plate 1515 may be provided by a pair of external angular contact bearings (collectively, 1535). Rotation of the input disc 1505 in this embodiment is provided via a large aperture electric motor, which includes a motor rotor 1540 and a motor stator 1545. The input disc 1505 may be affixed to the rotor 1540, for example, using fastener apertures 1550, and thus receives the input rotational force from the rotor 1540 of the drive motor. The stator 1545 of the drive motor may be affixed to the indexing plate 1515 (in this embodiment, to the first half 1515A of the indexing plate 1515) via fastening apertures 1560. The first half 1515A of the indexing plate may then be affixed to the second half 1515B of the indexing plate via fastener apertures 1565.

As described in detail above, the rotation of the input disc 1505 causes the spherical features 1525 of the power discs 1520 received in the grooves 1505A of the input disc 1505 to rotate the power discs 1520. The rotation of the power discs 1520, via the spherical features 1525 as they are received into the grooves 1510A of the output disc 1510, causes rotation of the output disc 1510. A tire or wheel 1555 may be affixed to the exterior perimeter of the output disc 1510 to contact a surface and thereby provide propulsion via rotation of the output disc 1510. Such a wheel 1555 may be comprises of rubber, polyurethane, or any other advantageous material, and of course, any material may be employed for the wheel 1555 as needed or desired.

Figure 16A:
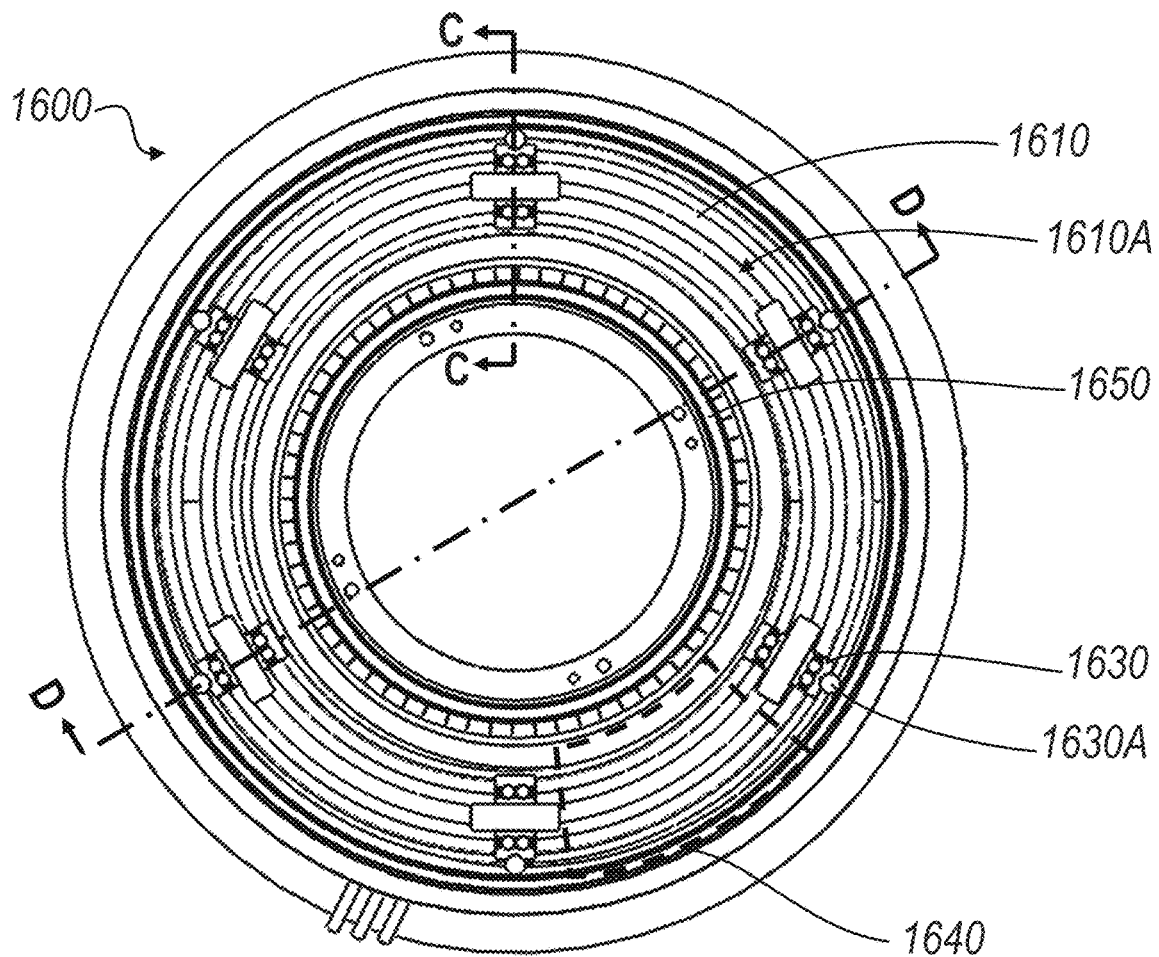
FIG. 16A illustrates a schematic side view of another embodiment of a large through hole version of a synchronic drive in accordance with the disclosed principles.
Figure 16B:
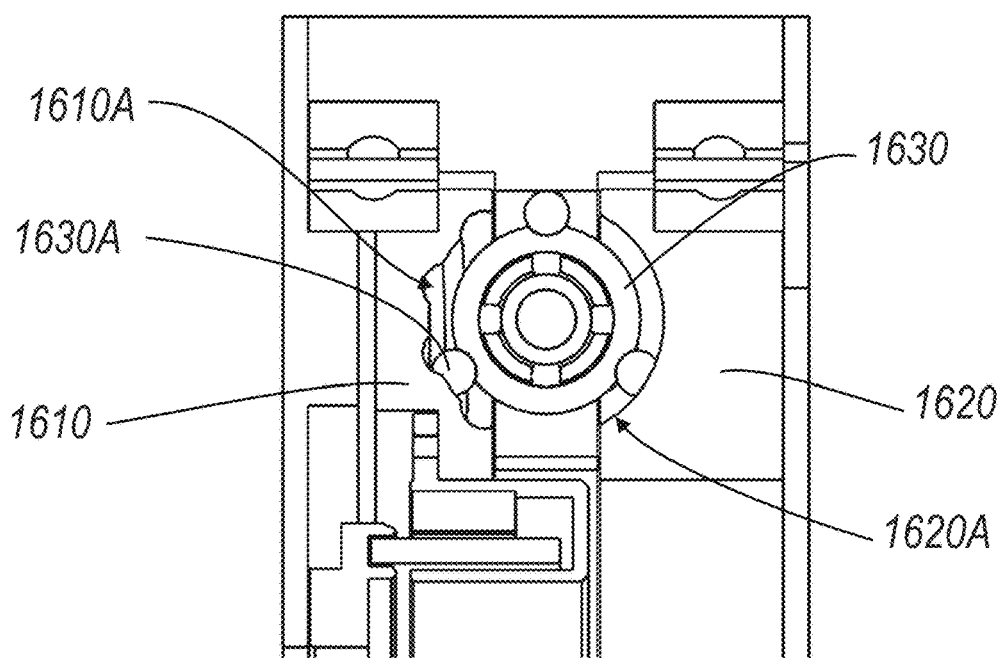
FIG. 16B illustrates a partial side cross-sectional view taken along line C-C of the large through-hole embodiment of a synchronic drive illustrated in FIG. 16A.
Figure 16C:
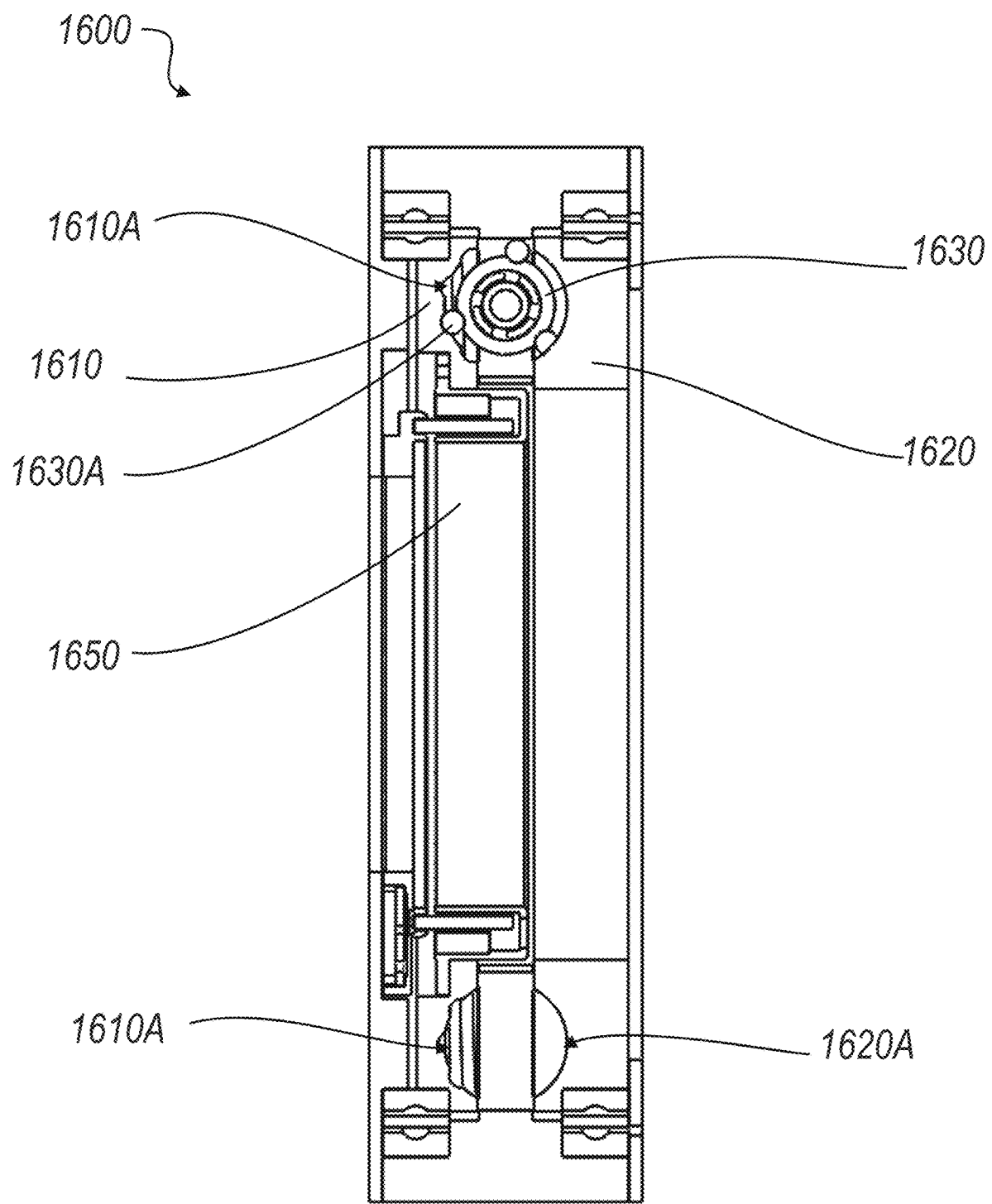
FIG. 16C illustrates a full side cross-sectional view taken along line D-D of the large through-hole embodiment of a synchronic drive illustrated in FIG. 16A.

FIG. 16A illustrates a schematic side view of another embodiment of a large through hole version of a synchronic drive designed and constructed in accordance with the disclosed principles. FIG. 16B illustrates a side cross-sectional view taken along line C-C of the large through-hole embodiment of a synchronic drive 1600 illustrated in FIG. 16A. FIG. 16C illustrates a full side cross-sectional view taken along line D-D of the large through-hole embodiment of a synchronic drive illustrated in FIG. 16A. This embodiment of a large through-hole synchronic drive 1600 is discussed with reference to FIGS. 16A and 16B collectively.

This embodiment of a large through-hole synchronic drive 1600 again includes an input disc 1610 and output disc 1620. As with all embodiments of a synchronic drive as disclosed herein, the input disc 1610 includes grooves 1610A formed in the design of an Archimedean spiral curved around the axis of rotation of the input disc 1610 and also curved when viewed in cross-sectional profile, and the output disc 1620 includes grooves 1620A formed in the design of toroidal helixes curved around the axis of rotation of the output disc 1620 and also curved when viewed in cross-sectional profile, as described above. Grooves 1610A are formed on the interior face of the input disc 1610, and grooves 1620A are formed on the interior face of the output disc 1620. These corresponding grooves are again configured to receive spherical features 1630A positioned around the perimeter of a corresponding plurality of power discs 1630 that have been placed, in the orientation discussed above, between the input and output discs 1610, 1620. In FIG. 16C, the power disc 1630 at the lower portion of the drawing is removed so as to reveal the grooves 1610A, 1620A of the input and output discs 1610, 1620.

Although the embodiment of a synchronic drive 1600 illustrated in FIGS. 16A and 16B is a large through-hole embodiment, it differs from the large through-hole embodiment illustrated in FIGS. 15A-15D in the positioning of the grooves 1610A, 1620A on the input and output discs 1610, 1620, respectively. Specifically, the axes of rotation of the input and output discs 1610, 1620 are the same axis, but the interior faces of the input and output discs 1610, 1620 are defined in planes that are perpendicular to this axis of rotation and parallel to one another. In contrast, looking briefly back at FIG. 15C, while the input and output discs 1505, 1510 also share a common axis of rotation, the interior faces of the input and output discs 1505, 1510 are defined in planes that are parallel with this shared axis of rotation. With the perpendicular orientation of the interior faces of the input and output discs 1610, 1620 with their shared axis of rotation, the embodiment of a synchronic drive 1600 in FIGS. 16A-16B comprises a rotation structure similar to that of a thrust bearing, while the embodiment in FIG. 15C comprises a rotation structure similar to that of a roller bearing.

The synchronic drive 1600 illustrated in FIGS. 16A-16B may also comprise various electronics and/or sensors 1640 may also be positioned within the synchronic drive 1600, such as in one or more spaces between the plurality of power discs 1630 comprised between the input and output discs 1610, 1620. Additionally, the synchronic drive 1600 may further comprise a centrally positioned motor 1650 that provides the input rotational force imparted to the input disc 1610. As such, the input disc 1610 may be coupled to the rotor of such a motor 1650, which may again include a through-hole at its center, in any advantageous manner. As a result of the rotation of the input disc 1610, the rotation of the grooves 1610A in the interior face of the input disc 1610 causes the spherical features 1630A on the power discs 1630 to move/rotate perpendicularly to the interior face of the input disc 1610, again due to the perpendicular orientation of the respective axes of rotation of the power discs 1630 with respect to the axis of rotation of the input and output discs 1610, 1620. Also as before, this rotation of the power discs 1630 comprises a lifting force created in response to the rotational force of the input disc 1610, and this lifting force is then imparted, again by the spherical features 1630A of the power discs 1630, onto the grooves 1620A of the output disc 1620. As the spherical features 1630A serially engage the grooves 1620A on the output disc 1620 by the rotation of the power discs 1630, the lifting force of the power discs 1630 is converted back to a rotational force onto the output disc 1620. A shaft or other device may then be affixed to the output disc 1620 to receive this output rotational force from the output disc 1620 at a rotational speed different than the rotational speed of the input disc 1610, thus providing the desired rotational ratio between input and output of the synchronic drive 1600.

While this disclosure has been particularly shown and described with reference to preferred embodiments, it will be understood by those skilled in the pertinent field art that various changes in form and detail may be made therein without departing from the spirit and scope of the invention. The inventors expect skilled artisans to employ such variations as appropriate, and the inventors intend the invention to be practiced otherwise than as specifically described herein. Accordingly, this disclosure includes all modifications and equivalents of the subject matter recited in the claims appended hereto, as permitted by applicable law. Moreover, any combination of the above-described elements in all possible variations thereof is encompassed by the disclosure unless otherwise indicated herein or otherwise clearly contradicted by context.

Also, while various embodiments in accordance with the principles disclosed herein have been described above, it should be understood that they have been presented by way of example only, and not limitation. Thus, the breadth and scope of this disclosure should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

The uses of the terms "a" and "an" and "the" and similar references in the context of describing the invention(s) (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein.

Any section headings included herein are provided for consistency with the suggestions under 37 C.F.R. 1.77 or otherwise to provide organizational cues. Any such headings, if present, shall not limit or characterize the invention(s) set out in any claims that may issue from this disclosure. Further, a description of a technology as background information is not to be construed as an admission that certain technology is prior art to any embodiment(s) in this disclosure. Neither is any "Summary" to be considered as a characterization of the embodiment(s) set forth in any claims issuing herefrom. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

Moreover, any Abstract or Summary provided is done so only to comply with 37 C.F.R. § 1.72(b), requiring an abstract that will allow the reader to quickly ascertain the nature of the technical disclosure. It is submitted with the understanding that it will not be used to interpret or limit the scope or meaning of any claims issuing herefrom. In addition, in the foregoing description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as any claims issuing herefrom will reflect, inventive subject matter lies in less than all features of a single disclosed embodiment. Thus, any claims appended hereto are hereby incorporated into the description, with each claim standing on its own as a separate embodiment.

Any and all publications, patents, and patent applications cited in this specification are herein incorporated by reference as if each individual publication, patent, or patent application were specifically and individually indicated to be incorporated by reference and set forth in its entirety herein.

What is claimed is:

1. A drive system altering a ratio between an input rotational speed and an output rotational speed, the drive system comprising:
    a rotatable input disc configured to receive an input rotational force and configured to rotate about a longitudinal axis;
    a rotatable output disc configured to rotate about the longitudinal axis, the output disc configured to provide an output rotational force;
    a drive core positioned between the input disc and the output disc to translate the input rotational force to the output rotational force, the drive core configured to rotate about the longitudinal axis and comprising at least one rotatable power disc, wherein each said at least one power disc is configured to:
    engage the input disc and the output disc, and
    rotate about a corresponding pivot axis, wherein a rotational plane of each of the at least one power disc intersects with the longitudinal axis;
    wherein as the input disc is rotated by the input rotational force, each of the at least one power disc engages the input disc causing rotation of each of the at least one power disc;
    wherein as the at least one power disc is rotated, each of the at least one power disc further engages the output disc causing rotation of the output disc; and
    wherein variations of driving features formed on an interior face of the input disc and of driving features formed on an interior face of the output disc alter a ratio of the input rotational force to the output rotational force.

2. The drive system of claim 1, wherein each power disc comprises at least one engaging feature protruding from its rotational perimeter and configured to engage the driving features of the input disc and the driving features of the output disc, and wherein the driving features of the input disc and the driving features on the output disc comprise grooves sized to receive the at least one engaging feature carried by each of the at least one power disc.

3. The drive system of claim 2, wherein the grooves on the interior face of the input disc and the interior face of the output disc comprise a size and shape substantially equal to a size and shape of each of the at least one engaging feature.

4. The drive system of claim 2, wherein the grooves comprise a circular arch shape when viewed in cross-sectional profile, and wherein each of the at least one engaging feature comprises a corresponding shape.

5. The drive system of claim 2, wherein the grooves comprise a Gothic arch shape when viewed in cross-sectional profile, and wherein each of the at least one engaging feature comprises a corresponding shape.

6. The drive system of claim 2, wherein the input grooves of the input disc follow the shape of a three-dimensional Archimedean spiral when viewed perpendicular to the plane of rotation defined by said interior face.

7. The drive system of claim 6, wherein the Archimedean spiral shape of the input grooves of the input disc further comprises a curvature formed into the interior face of the input disc when viewed parallel to the plane of rotation defined by said interior face, wherein shallow edges of said curvature are proximate a center and outer edge of said interior face and a deepest point of said curvature is midway between the center and outer edge of said interior face.

8. The drive system of claim 7, wherein the radius of said curvature is equal to a radius of curvature of each of the at least one power disc as measured from a rotational axis of each power disc to a center of the at least one engaging feature carried on the rotational perimeter of each power disc.

9. The drive system of claim 2, wherein the output grooves of the output disc follow the shape of a three-dimensional toroidal helix curved around a center of rotation of the output disc about the longitudinal axis.

10. The drive system of claim 9, wherein turns of the toroidal helix shape of the output grooves of the output disc comprise a radius of curvature formed into the interior face of the output disc when viewed parallel to the plane of rotation defined by said interior face, wherein shallow edges of said curvature are proximate a center and outer edge of said interior face and a deepest point of said curvature is midway between the center and outer edge of said interior face.

11. The drive system of claim 10, wherein said radius of curvature is equal to a radius of curvature of each of the at least one power disc as measured from a rotational axis of each power disc to a center of the at least one engaging feature carried on the rotational perimeter of each power disc.

12. The drive system of claim 10, wherein turns of the toroidal helix shape of the output grooves of the output disc comprise a second radius of curvature when viewed perpendicular to the plane of rotation defined by said interior face.

13. The drive system of claim 10, wherein the toroidal helix shape comprises a plurality of starts corresponding to the number of engaging features on the at least one power disc.

14. The drive system of claim 1, wherein the drive core comprises at least one indexing plate configured to position the at least one power disc between the input disc and the output disc.

15. The drive system of claim 14, wherein said at least one indexing plate is further configured to secure at least one pivot shaft though which a corresponding pivot axis passes, and about which corresponding ones of the at least one power disc rotate.

\* \* \* \* \*